United States Patent
Balabine

(10) Patent No.: US 10,257,211 B2
(45) Date of Patent: Apr. 9, 2019

(54) METHOD, APPARATUS, AND COMPUTER-READABLE MEDIUM FOR DETECTING ANOMALOUS USER BEHAVIOR

(71) Applicant: Informatica LLC, Redwood City, CA (US)

(72) Inventor: Igor Balabine, Menlo Park, CA (US)

(73) Assignee: Informatica LLC, Redwood City, CA (US)

( * ) Notice: Subject to any disclaimer, the term of this patent is extended or adjusted under 35 U.S.C. 154(b) by 141 days.

(21) Appl. No.: 15/160,783

(22) Filed: May 20, 2016

(65) Prior Publication Data

US 2017/0339168 A1 Nov. 23, 2017

(51) Int. Cl.
*H04L 29/06* (2006.01)
*G06F 17/30* (2006.01)

(52) U.S. Cl.
CPC .... *H04L 63/1416* (2013.01); *G06F 17/30864* (2013.01)

(58) Field of Classification Search
CPC ........ G06F 21/00; G06F 21/50; G06F 21/552; G06F 17/30864; H04L 63/1416
See application file for complete search history.

(56) References Cited

U.S. PATENT DOCUMENTS

| | | | |
|---|---|---|---|
| 9,185,095 B1 | 11/2015 | Moritz et al. | |
| 2010/0094768 A1* | 4/2010 | Miltonberger | G06Q 10/067 705/325 |
| 2010/0228898 A1* | 9/2010 | Aranguren | G06F 3/061 710/56 |
| 2014/0096249 A1 | 4/2014 | Dupont et al. | |
| 2014/0325646 A1* | 10/2014 | Turgeman | G06F 21/316 726/22 |
| 2015/0026808 A1 | 1/2015 | Perdisci et al. | |
| 2015/0319185 A1* | 11/2015 | Kirti | H04L 67/306 726/23 |
| 2016/0026939 A1* | 1/2016 | Schiffer | G06F 17/24 705/7.11 |
| 2016/0100009 A1 | 4/2016 | Zoldi et al. | |

OTHER PUBLICATIONS

International Search Report and Written Opinion cited in corresponding International Application No. PCT/US16/37847 dated Sep. 8, 2016.

* cited by examiner

*Primary Examiner* — Don G Zhao
(74) *Attorney, Agent, or Firm* — Amardeep S. Grewal; Reed Smith LLP

(57) ABSTRACT

An apparatus, computer-readable medium, and computer-implemented method for detecting anomalous user behavior, including storing user activity data collected over an observation interval, the user activity data comprising a plurality of data objects and corresponding to a plurality of users, grouping a plurality of data objects into a plurality of clusters, calculating one or more outlier metrics corresponding to each cluster, calculating an irregularity score for each of one or more data objects in the plurality of data objects, generating one or more object postures for the one or more data objects, comparing each of at least one object posture in the one or more object postures with one or more previous object postures corresponding to a same user as the object posture to identify anomalous activity of one or more users in the plurality of users.

51 Claims, 34 Drawing Sheets

| Data Object | # Data Stores Accessed | # Requests | # Sensitive Data Stores Accessed |
|---|---|---|---|
| 1 | 23 | 11 | 4 |
| 2 | 25 | 5 | 5 |
| 3 | 27 | 6 | 5 |
| 4 | 21 | 10 | 4 |
| 5 | 16 | 4 | 3 |
| 6 | 28 | 6 | 5 |
| 7 | 53 | 18 | 10 |
| 8 | 48 | 22 | 9 |
| 9 | 15 | 9 | 3 |
| 10 | 11 | 7 | 2 |
| 11 | 8 | 7 | 2 |
| 12 | 27 | 11 | 5 |
| 13 | 35 | 13 | 7 |
| 14 | 17 | 5 | 3 |
| 15 | 46 | 21 | 9 |
| 16 | 29 | 7 | 6 |
| 17 | 19 | 4 | 4 |
| 18 | 22 | 11 | 4 |
| 19 | 51 | 31 | 10 |

Fig. 2

| Data Object | # Data Stores Accessed | # Requests | # Sensitive Data Stores Accessed |
|---|---|---|---|
| 1 | 0.418 | 0.502 | 0.063 |
| 2 | 0.455 | 0.306 | 0.091 |
| 3 | 0.492 | 0.336 | 0.091 |
| 4 | 0.383 | 0.467 | 0.063 |
| 5 | 0.299 | 0.277 | 0.044 |
| 6 | 0.511 | 0.336 | 0.091 |
| 7 | 0.870 | 0.726 | 0.409 |
| 8 | 0.822 | 0.821 | 0.320 |
| 9 | 0.284 | 0.433 | 0.044 |
| 10 | 0.227 | 0.367 | 0.030 |
| 11 | 0.191 | 0.367 | 0.030 |
| 12 | 0.492 | 0.502 | 0.091 |
| 13 | 0.637 | 0.570 | 0.178 |
| 14 | 0.315 | 0.306 | 0.044 |
| 15 | 0.800 | 0.800 | 0.320 |
| 16 | 0.529 | 0.367 | 0.128 |
| 17 | 0.348 | 0.277 | 0.063 |
| 18 | 0.400 | 0.502 | 0.063 |
| 19 | 0.853 | 0.941 | 0.409 |

| Data Object | # Data Stores Accessed | # Requests |
|---|---|---|
| 1 | 0.418 | 0.502 |
| 2 | 0.455 | 0.306 |
| 3 | 0.492 | 0.336 |
| 4 | 0.383 | 0.467 |
| 5 | 0.299 | 0.277 |
| 6 | 0.511 | 0.336 |
| 7 | 0.870 | 0.726 |
| 8 | 0.822 | 0.821 |
| 9 | 0.284 | 0.433 |
| 10 | 0.227 | 0.367 |
| 11 | 0.191 | 0.367 |
| 12 | 0.492 | 0.502 |
| 13 | 0.637 | 0.570 |
| 14 | 0.315 | 0.306 |
| 15 | 0.800 | 0.800 |
| 16 | 0.529 | 0.367 |
| 17 | 0.348 | 0.277 |
| 18 | 0.400 | 0.502 |
| 19 | 0.853 | 0.941 |

| Singularity | MOA value | LOF value | Irregularity | Comment |
|---|---|---|---|---|
| VHigh | any | any | VHigh | A very small cluster always has a good chance to be an anomaly |
| High | VHigh | VHigh | High | Relatively small groups characterized by distinct behavior |
| High | VHigh | High | High | |
| High | VHigh | Medium | High | |
| High | VHigh | Low | High | |
| High | High | VHigh | High | |
| High | High | High | High | |
| High | High | Medium | High | |
| High | Medium | VHigh | High | |
| High | Medium | High | High | |
| High | Low | VHigh | High | |
| Medium | VHigh | VHigh | High | |
| Medium | VHigh | High | High | |
| Medium | High | VHigh | High | |
| High | High | Low | Medium | Distinct groups which members are characterized by similar behavior |
| High | Medium | Medium | Medium | |
| High | Medium | Low | Medium | |
| High | Low | High | Medium | |
| High | Low | Medium | Medium | |
| High | Low | Low | Medium | |
| Medium | VHigh | Medium | Medium | |
| Medium | VHigh | Low | Medium | |
| Medium | High | High | Medium | |
| Medium | High | Medium | Medium | |
| Medium | High | Low | Medium | |
| Medium | Medium | VHigh | Medium | |
| Medium | Medium | High | Medium | |
| Medium | Medium | Medium | Medium | |
| Medium | Low | VHigh | Medium | |
| Low | VHigh | VHigh | Medium | |
| Low | VHigh | High | Medium | |
| Medium | Medium | Low | Low | Generic population with minor distinct features |
| Medium | Low | High | Low | |
| Medium | Low | Medium | Low | |
| Low | VHigh | Medium | Low | |
| Low | High | VHigh | Low | |
| Low | High | High | Low | |
| Low | High | Medium | Low | |
| Low | Medium | VHigh | Low | |
| Low | Medium | High | Low | |
| Low | Medium | Medium | Low | |
| Medium | Low | Low | VLow | Generic population characterized by similar behavior |
| Low | VHigh | Low | VLow | |
| Low | High | Low | VLow | |
| Low | Medium | Low | VLow | |
| Low | Low | VHigh | VLow | |
| Low | Low | High | VLow | |
| Low | Low | Medium | VLow | |
| Low | Low | Low | VLow | |

Map each activity parameter in the plurality of activity parameters to a segment value in a set of segment values and assign a corresponding variation value to each activity parameter based at least in part on a fuzzy membership function corresponding to that activity parameter

1801

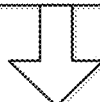

Map the irregularity score of the data object to an irregularity value in a set of irregularity values and assign a corresponding irregularity variation value to the irregularity score based at least in part on an irregularity fuzzy membership function

1802

Map one or more activity parameters in the plurality of activity parameters to one or more additional segment values in the set of segment values based at least in part on one or more variation values corresponding to the one or more activity parameters and one or more fuzzy membership functions corresponding to the one or more activity parameters

1803

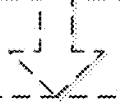

Map the irregularity score to one or more additional irregularity values in the set of irregularity values based at least in part on the irregularity variation value corresponding to the irregularity score and the irregularity fuzzy membership function

1804

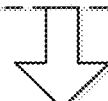

Generating the posture of the data object based at least in part on a plurality of segment values mapped to the plurality of activity parameters and the irregularity value mapped to the irregularity score

Determine one or more possible irregularity values corresponding to the irregularity score, wherein the one or more possible irregularity values are based on the irregularity variation value assigned to the irregularity score, the irregularity value mapped to the irregularity score, and the irregularity fuzzy membership function

2801

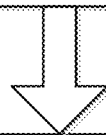

Concatenate the one or more possible irregularity values corresponding to the irregularity score to generate a concatenated list of possible irregularity values

2801

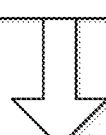

Map the concatenated list of possible irregularity values to the irregularity score

METHOD, APPARATUS, AND COMPUTER-READABLE MEDIUM FOR DETECTING ANOMALOUS USER BEHAVIOR

BACKGROUND

Data assets monitoring is a critical data management and information technology (IT) function often used by Enterprises and Cloud Services Providers, which involves watching the activities occurring on an internal network for problems related to performance, reliability, misbehaving hosts, suspicious user activity, etc.

Anomaly detection is the identification of items, events or behavior which differs from an expected, desired or normal pattern. When studied in the context of data consumers, anomalous behavior detection mechanisms must be capable of distinguishing unusual behavior patterns caused by regular operations such as data backup to a remote storage device and behavior patterns caused by the presence of malicious actors performing sensitive data hoarding, scanning, snooping, and legitimate user impersonation.

A 2014 study by Intel Security estimates global economy losses due to cybercrime between $375 and $575 Billion and indicates a significant growth trend in the cybercrime industry. Cybercrime affects private businesses, global corporations, individuals, government and military organizations. Sophos estimates that in 2013 more than 800 million individual data records were compromised.

In order to reduce or eliminate losses from cybercrime operations, anomalous activities triggered by malicious actors must be detected and reported to IT security personnel in a timely manner.

However, data user anomalous behavior detection becomes exceptionally difficult when the number of data users and data assets under observation increases, and the complexity of each observed item or event also increase. Detecting anomalous behavior of data users is an extreme example of a complex anomaly detection problem.

Traditionally, detection of anomalous events attributed to data users was in the domain of network security analysts. Typically, a security analyst possesses a collection of tools accumulated over the years while investigating security incidents. A large majority of those investigative tools are suitable for forensic investigations that take place after a security incident has been discovered. However, by the time of discovery cybercriminals may have already accomplished their objectives and retrieved valuable information from the victim's data assets.

Due to the vast amount of data, the data arrival rate and the number of observed parameters that may be relevant, only machine-learning-based methods are capable of handling user behavior anomaly detection tasks. Machine learning methods capable of providing timely alerting of anomalous events may be classified into two groups: unsupervised machine learning methods and supervised machine learning methods.

Unsupervised machine learning methods operate on "raw" data and do not require input from an expert. Being automatic, unsupervised machine learning methods suffer from a high rate of false positives.

Supervised machine learning assumes a-priori knowledge of the universe of discourse and is based on expert information as a foundation of the learning process. While being more precise in its findings, supervised machine learning methods require a significant knowledge base and thus are less adaptive to the changes in the universe of discourse than unsupervised machine learning methods.

Accordingly, improvements are needed in systems for anomaly detection in order to identify anomalous events in a networked environment in real time and alert operators to a breach-in-progress condition.

BRIEF DESCRIPTION OF THE DRAWINGS

FIG. 2 shows a chart of user activity data over an observation interval according to an exemplary embodiment.

FIG. 4 illustrates a chart showing the results of a normalization process applied to user activity data according to an exemplary embodiment.

FIG. 5 illustrates a chart showing the results of an input data dimensionality reduction process applied to user activity data according to an exemplary embodiment.

FIG. 15 illustrates a table showing a set of fuzzy rules for determining irregularity levels according to an exemplary embodiment.

FIG. 18 illustrates a method that is performed for each data object in the plurality of data objects to generate a plurality of object postures for the plurality of data objects based at least in part on the plurality of activity parameters corresponding to each data object and the irregularity score of each data object according to an exemplary embodiment.

FIG. 28 illustrates a flowchart for mapping the irregularity score to one or more additional irregularity values in the set of irregularity values based at least in part on the irregularity variation value corresponding to the irregularity score and the irregularity fuzzy membership function according to an exemplary embodiment.

DETAILED DESCRIPTION

Figure 1:
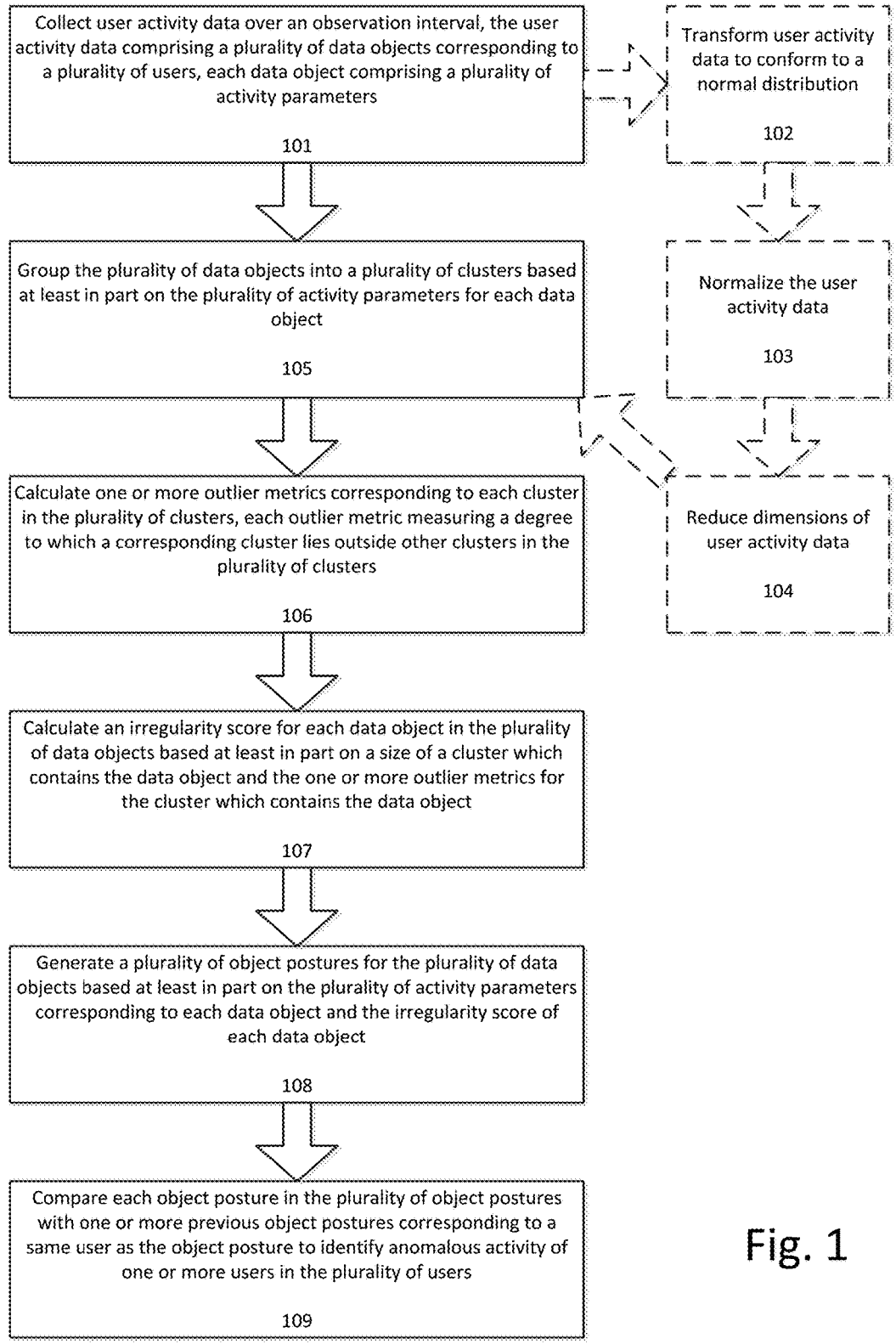
FIG. 1 illustrates a flowchart for a method for detecting anomalous user behavior according to an exemplary embodiment.

While methods, apparatuses, and computer-readable media are described herein by way of examples and embodiments, those skilled in the art recognize that methods, apparatuses, and computer-readable media for detecting anomalous user behavior are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered methods, apparatuses, and computer-readable media for detecting anomalous user behavior. The disclosed methods and systems involve data object characterization by means of one or a plurality of attributes, such as activity parameters, creation of the data object's posture description, temporal tracking of changes in the data object's posture pattern and classification of identified changes. More specifically, the disclosed methods and systems involve processing of user activity metadata obtained through data assets monitoring, which may efficiently result in useful information being reported in a timely manner to a consumer of the metadata.

Applicant has discovered a novel approach to describing and evaluating temporal changes in the state ("posture") of a data object under observation. A temporal sequence of such postures comprises a behavioral pattern pertaining to the data object under observation and a significant change in the object's posture over time translates into a notification about a deviation.

The present system introduces a novel approach to a data object description by using a DNA-like sequence of base elements each of which characterizes state of a particular attribute of said data object. Base elements describing data object's attributes are taken from a finite set of linguistic categories easily understood and manipulated by the operator.

The present system utilizes both unsupervised and supervised machine learning methods by combining in a novel fashion, predictive features of the unsupervised machine learning techniques with robust classification capabilities of the supervised machine learning algorithms.

The present system is not limited to a particular type of the data object's attributes. A data object's attributes may take, without limitation, the form of continuous variables, nominal variables, ordinal variables, symmetric and asymmetric binary variables.

The present system can operate in a streaming fashion without resorting to a post factum analysis and provide information about a data object's behavior changes in real time. It should be appreciated that the method disclosed in this invention is applicable to the data objects' behavior information at rest as well.

Though the description involves examples involving analysis of data consumer behavior in which the data object attributes are activity parameters, the disclosed methods, systems, and computer-readable medium can also be utilized to analyze behavioral patterns of arbitrary data objects such as network end points, financial trades, telemetry of all kinds, demographic trends, hydrocarbon reservoirs etc. For example, the methods and system for anomalous data detection disclosed herein can be utilized for detection of changes in the chemical composition of the petrochemical products reported by the sensors deployed in an oil well or for finding anomalous patterns in a financial trading network. In the former example, the data objects can be sensor readings from the various sensors, with each data object corresponding to a different sensor. In the latter example, the data objects can be trades in an order book or trades that have been executed, with each data object corresponding to one or more parties to the trade, a trading platform, or an exchange.

FIG. 1 illustrates a flowchart for a method for detecting anomalous user behavior according to an exemplary embodiment. At step 101, user activity data is collected over an observation interval.

In addition to the observation interval, there can be a separate user activity data collection interval. For example, the user activity data collection interval length can be between 30 seconds and one week. The observation interval can be a multiple of the user activity data collection interval. For example, the observation interval length can be between 20 to 40 multiples of the user activity data collection interval. In this scenario, the user activity data would be collected at every user activity data collection interval and detection of anomalous user behavior would occur at each observation interval. Of course, a single time interval can be utilized for both the user activity data collection interval and the observation interval.

The user activity data can include a plurality of data objects corresponding to a plurality of users and each data object in the plurality of data objects can include a plurality of activity parameters (the attributes of the data object). For example, the plurality of activity parameters can include one or more of a number of data stores accessed by a user in the observation period, a number of sensitive data stores accessed by a user in the observation period, a number of records affected by a user in the observation period, a number of requests by a user in the observation period, times of access by a user in the observation period (including time, weekday, and/or date), a number of sensitive requests by a user in the observation period, a number of sensitive records affected by a user in the observation period, and/or a user geographic location.

The plurality of activity parameters can also include a user host relocation anomaly metric, a user activity timing anomaly metric, and/or a forwarding network path metric of a user. The user host relocation anomaly metric is a value on the [0, 1] interval indicating a degree of irregularity of user relocations/locations. A value closer to 1 indicates anomalous user relocation. The user activity timing anomaly metric is a value on the [0, 1] interval indicating a degree of irregularity of user work hours. A value closer to 1 indicates anomalous user work hours. The forwarding network path of the user is the location from which the user accessed a resource while being on an internal network (e.g. VPN, wireless, LAN). It is nominal data which is quantified using a probabilistic approach. The forwarding network path metric can include some metric related to the forwarding network path data, such as how often a particular user works from a VPN address pool or from a particular wireless LAN.

FIG. 2 shows a chart 200 of user activity data over an observation interval according to an exemplary embodiment. As shown in FIG. 2, there are 19 data objects, each of which includes three activity parameters 201A, 201B, and 201C. Each of the 19 data objects can correspond to activity data for a different user. Activity parameter 201A corresponds to the number of data stores accessed by a corresponding user, activity parameter 201B corresponds to the number of requests made by a corresponding user, and activity parameter 201C corresponds to the number of sensitive data stores accessed by a corresponding user. For example, data object 19 includes the values shown by bracket 202. Specifically, data object 19 corresponds to user 19 and as shown in the figure, user 19 accessed 51 data stores, made 31 requests, and accessed 10 sensitive data stores. FIG. 2 is presented for the purpose of explanation only, and the actual user activity data or other input data set can have more or less dimensions and/or different activity parameters.

Returning to FIG. 1, optionally, at step 102, the user activity data can be transformed to conform to a normal distribution. The system can be required to utilize input data which follows a multivariate normality (Gaussian) distribution. In this case, input data can be checked for normality and transformed to a normal distribution, if necessary.

Figure 3:
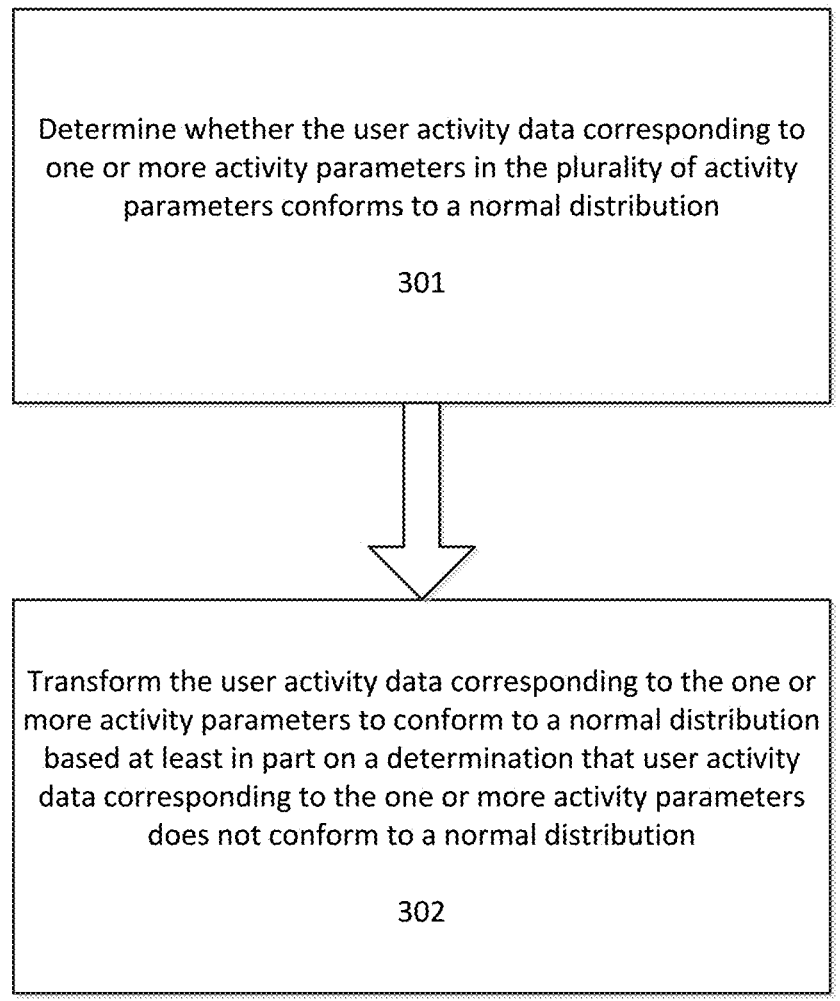
FIG. 3 illustrates a flowchart for transforming user activity data to conform to a normal distribution according to an exemplary embodiment.

FIG. 3 illustrates a flowchart for transforming user activity data to conform to a normal distribution. At step 301 it is determined whether the user activity data corresponding to one or more activity parameters in the plurality of activity parameters conforms to a normal distribution.

In order to determine whether the user activity data is normally distributed, its distribution is compared to that of a well-known test data set which adheres to a normal distribution by executing the Kolmogorov-Smirnov test. Of course, other statistical distribution verification tests, such as the Shapiro-Wilk multivariate normality test or the Anderson-Darling test, can be used in place of the Kolmogorov-Smirnov test.

At step 302 the user activity data corresponding to the one or more activity parameters is transformed to conform to a normal distribution based at least in part on a determination that user activity data corresponding to the one or more activity parameters does not conform to a normal distribution.

When the user activity data is determined to deviate from a normal distribution, it can be transformed using the one-parameter Box-Cox power transformation:

$$x_i^{(\lambda)} = \begin{cases} \frac{y_i^\lambda - 1}{\lambda} & \text{if } \lambda \neq 0 \\ \ln(y_i) & \text{if } \lambda = 0 \end{cases}$$

where $\lambda$ is estimated using the profile likelihood function.

Of course, non-normal data can be transformed to adhere to a normal distribution by other means such as Tukey's Ladder of Powers or similar methods.

Returning to FIG. 1, optionally, at step 103, the user activity data can be normalized by normalizing the user activity data corresponding to one or more activity parameters in the plurality of activity parameters.

As a result of the user activity data being multidimensional, each data dimension corresponding to each of the activity parameters may vary significantly in scale from other data dimensions corresponding to other activity parameters. For example the # data stores accessed metric could vary between 1 and 10 while other metrics, such as the number of accessed data records and the number of accessed sensitive data records, can be counted in the millions and easily suppress the input of the outbound packet size metric. The normalization process resolves input data scaling issues.

For each of the metrics corresponding to the user activity parameters, normalization can be performed by recalculating each data point X(i) metric, x̃(i), in such a fashion that there is a unit distance between the $10^{th}$ and the $90^{th}$ percentiles of that metric:

$$\tilde{X}(i) = \frac{X(i)}{f_{90}(X(i)) - f_{10}(X(i))}$$

where X(i)={$x_j$=(i)}, . . . , N, $f_p$ (y)–a function returning the $p^{th}$ percentile of the metric measurements.

Upon completing the initial normalization step, the metrics can be further normalized to the [0, 1] interval by applying a sigmoid function:

$$s(x) = \frac{1}{1 + e^{-\frac{x-\mu}{\beta}}}$$

where $\mu=f_{50}$ (X(i))–metric median value, $\beta=f_{90}(X(i))$–the "bend point" of the sigmoid function.

Of course the user activity data normalization step can be performed by applying a different normalization transform such as hyperbolic tangent, Z-score, etc.

FIG. 4 illustrates a chart 400 showing the results of a normalization process applied to the user activity data of FIG. 2. As shown in FIG. 4, each of the values of each of the activity parameters is between 0 and 1.

Returning to FIG. 1, optionally, at step 104, a number of dimensions in the user activity data can be reduced by removing data corresponding to one or more activity parameters in the plurality of activity parameters. This process is configured to find important metrics in the user activity data and discard other metrics which equate to noise in the multidimensional input data space, thus reducing dimensionality of the user activity data.

Reducing the number of dimensions in input data (the user activity data) achieves speed up of subsequent clustering steps by engaging the Principal Components Analysis ("PCA") method which reduces the number of the data object's dimensions as compared to the number of data object's dimensions in the original universe of discourse. The PCA input data dimensionality reduction method transforms input data coordinates in such way that eigenvectors of the covariance matrix become new coordinate axis.

While PCA merely transforms the coordinate system, the actual data dimensionality reduction procedure can be achieved by employing Horn's Parallel Analysis ("PA") technique.

PA is based on comparing eigenvalues of an actual data set with eigenvalues of an artificial data set of uncorrelated normal variables of the same dimensionality as the actual data set. While dimensionality of the actual data set is known upfront the size of the actual user activity data set is variable and cannot be predicted. Due to the data set size variability, a pre-generated table of uncorrelated normal variables eigenvalues can be used when performing the PCA procedure at run-time. A table of uncorrelated normal variables eigenvalues can be generated offline and can be interpolated at runtime.

Of course, techniques other than the combination of the PCA and PA methods can be used to reduce input data dimensionality. For example, the Linear Discriminant Analysis method or the Sufficient Dimensionality Reduction approach can also be used to achieve the objective of reducing dimensionality of the input data.

FIG. 5 illustrates a chart 500 showing the results of an input data dimensionality reduction process applied to the user activity data of FIG. 3. As shown in FIGS. 4-5, the data corresponding to the activity parameter "# of sensitive data stores accessed" has been removed from the user activity data, thereby reducing the data set from three dimensions to two dimensions. Of course, the results shown in FIG. 5 are for the purpose of illustration only, and the actual results of a data dimensionality reduction step can differ.

Returning to FIG. 1, at step 105 the plurality of data objects are grouped into a plurality of clusters based at least in part on the plurality of activity parameters for each data object. The clustering step can receive the output of the input data dimensionality reduction step 104, the normalization step 103, the transformation step 102, or the collection step 101. Additionally, the clustering step outputs information about groups of similar data points ("clusters").

Clustering of data objects can be performed using the Balanced Iterative Reducing and Clustering using Hierarchies ("BIRCH") method to cluster the input data objects. BIRCH is a robust clustering algorithm developed for analyzing large volumes of multivariate data. The algorithm is capable of ingesting input data in a continuous fashion. The clustering step includes four steps, described below.

The first step is building a Clustering Feature ("CF") tree—during this stage input data is loaded into a B-tree like structure and data objects are agglomerated in the leaf nodes based on relative Euclidean distance between the data objects. Data objects merging threshold is an input parameter of the BIRCH algorithm and is set initially to a small value. When the input data is normalized to the [0, 1] interval, a relatively small merging threshold value, such as 0.0001 can be used. Additionally, as discussed below, the threshold value can be automatically corrected during a subsequent intermediate step.

The second step is CF tree condensing—this operation can be triggered when the CF tree exceeds a preset size. At this time the samples merging threshold can be recomputed and the CF tree can be rebuilt. A new value of the merging threshold can then be derived from the distance between entries in the existing CF tree.

The third step is global clustering—at this step the BIRCH clustering algorithm applies a regular clustering algorithm to information collected in the CF tree. For example, the BIRCH algorithm implementation can utilize two global clustering options: CF tree refinement and Hierarchical Clustering ("HC"). While HC is capable of producing finer granularity clusters, its run time is significantly longer and memory consumption is significantly higher than that of the CF tree refinement procedure.

The fourth step is cluster matching—during this step input data objects are matched with the clusters produced after the refinement step.

While the BIRCH algorithm is described above for the clustering step, clustering methods other than BIRCH can be used during the clustering step. For example, clustering algorithms such as DBSCAN or K-means can be used to group the data objects into clusters.

Figure 6:
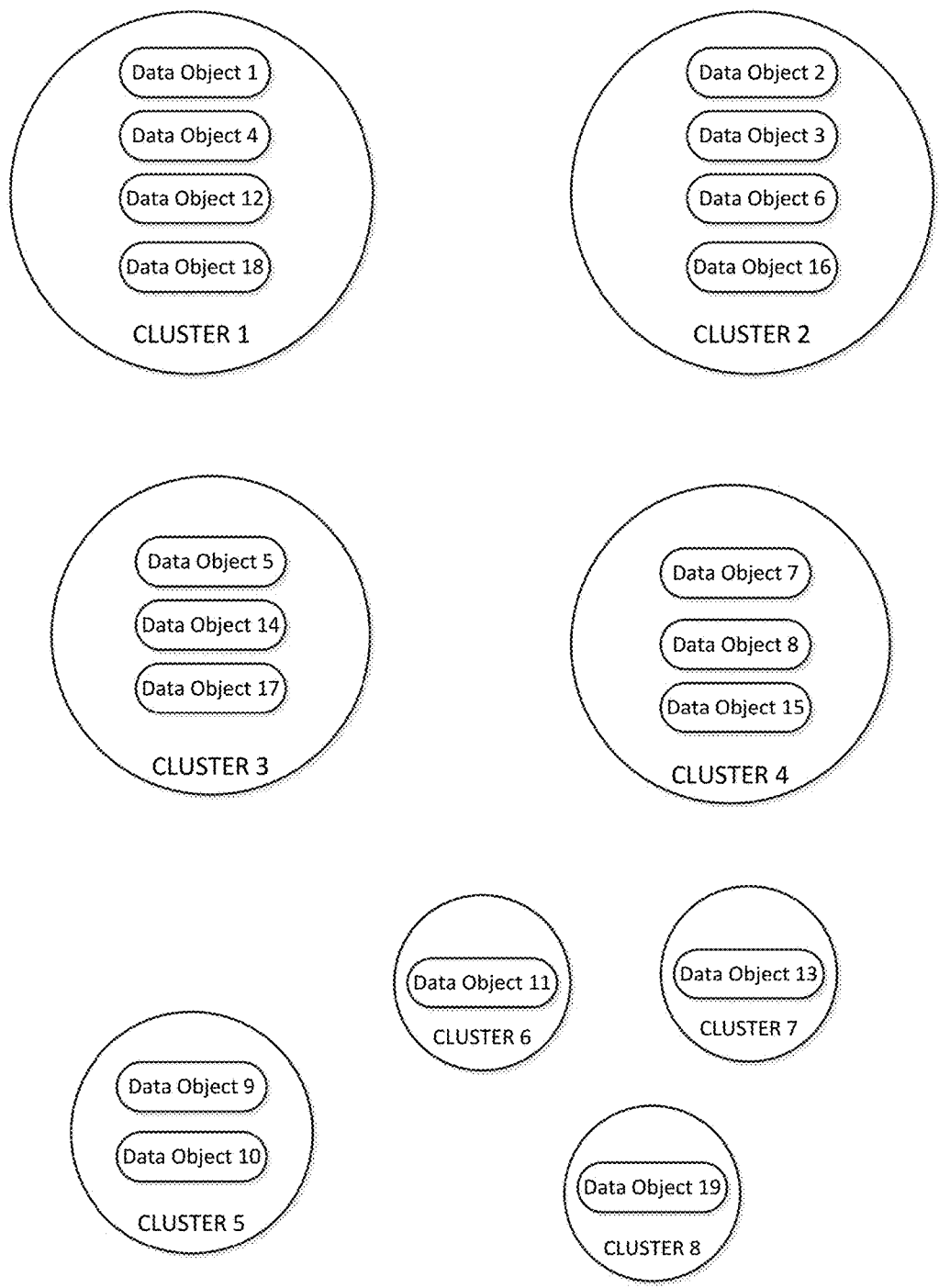
FIG. 6 illustrates the result of a clustering step applied to data objects according to an exemplary embodiment.

FIG. 6 illustrates the result of a clustering step applied to the data objects shown in FIG. 5. As shown in FIG. 6, seven clusters are generated to group the 19 data objects shown in FIG. 5. For example, Cluster 5 includes Data Object 9 and Data Object 10. In another example, Cluster 11 includes only Data Object 11. Of course, these clusters are provided for illustration only, and the results of applying the above-mentioned clustering steps to the data in FIG. 5 may differ.

At step 106 of FIG. 1, one or more outlier metrics corresponding to each cluster in the plurality of clusters are calculated. Each outlier metric in the one or more outlier metrics can measure a degree to which a corresponding cluster lies outside of other clusters in the plurality of clusters. This step checks the resulting collection of clusters for the presence of outlying entities—one or more clusters which lie outside most of the other clusters in the resulting collection The one or more outlier metrics can include one or more of a distance-based outlier metric and a density-based cluster outlier metric. The difference between these types of outlier metrics is explained with reference to FIGS. 7-9.

Figure 7:
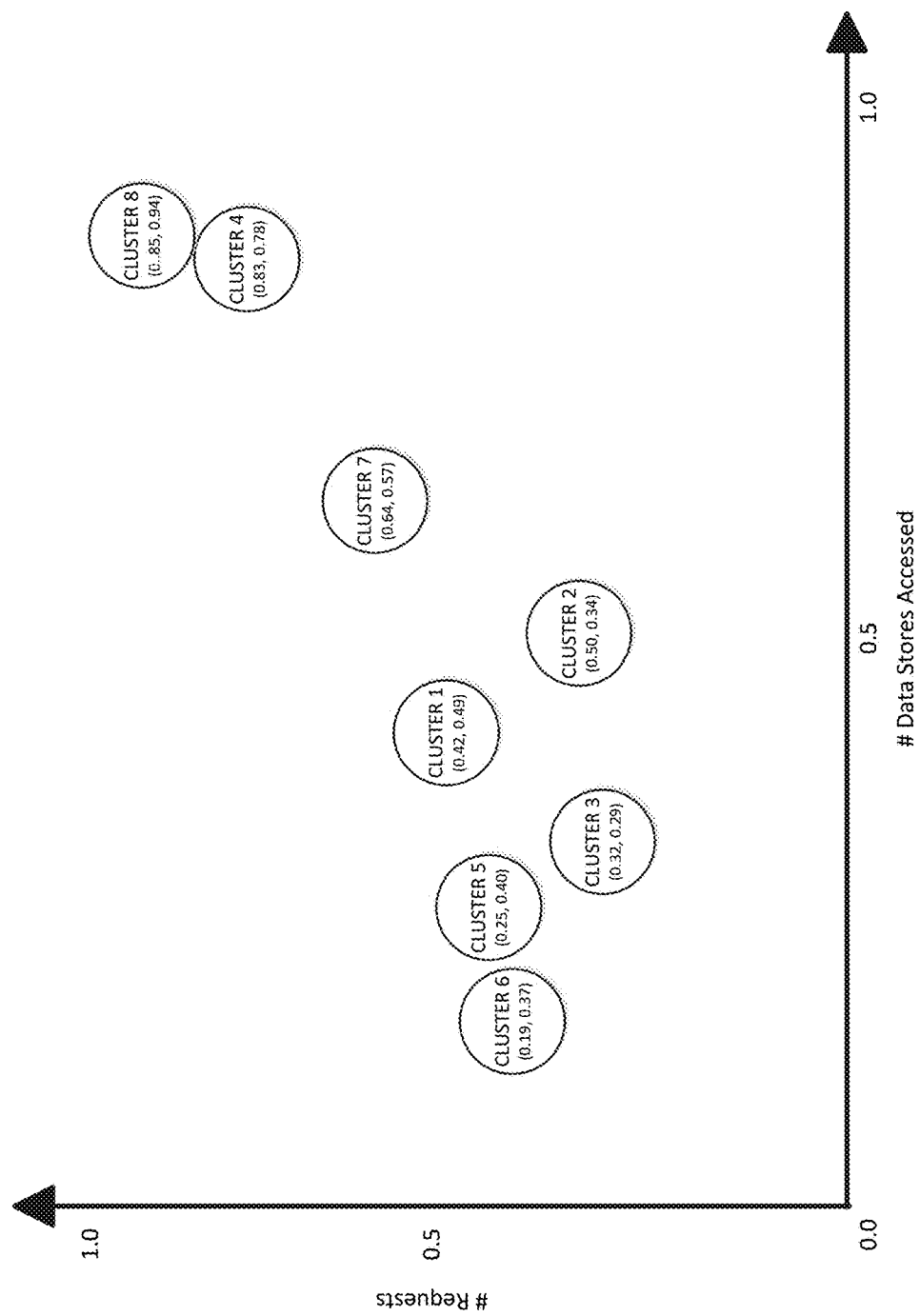
FIG. 7 illustrates clusters in a two-dimensional space corresponding to two activity parameters of data objects according to an exemplary embodiment.

FIG. 7 illustrates the clusters of FIG. 6 in a two-dimensional space corresponding to the two activity parameters of the data objects of FIG. 5. Each of the clusters is plotted at the average value of the data objects contained within the cluster. For example, Cluster 5 includes Data Object 9 and Data Object 10. The average number of data stores accessed metric between Data Object 9 and Data Object 10 is 0.25 (when normalized as shown in FIG. 5). The average number of requests metric between Data Object 9 and Data Object 10 is 0.40 (when normalized as shown in FIG. 5). The x-axis of the graph in FIG. 7 is number of data stores accessed and the y-axis is numbers of requests. Therefore, Cluster 5 is plotted at the point (0.25, 0.40).

Of course, if the user activity data included more dimensions, then the clusters could be plotted in a corresponding dimensional space. The plot of FIG. 7 is provided for illustration only and is not meant to be limiting. For example, if the user activity data (or the user activity data after transformation, normalization and/or dimension reduction) had k dimensions, then the clusters could be plotted and outlier metrics could be calculated for a k-dimensional space.

Figure 8:
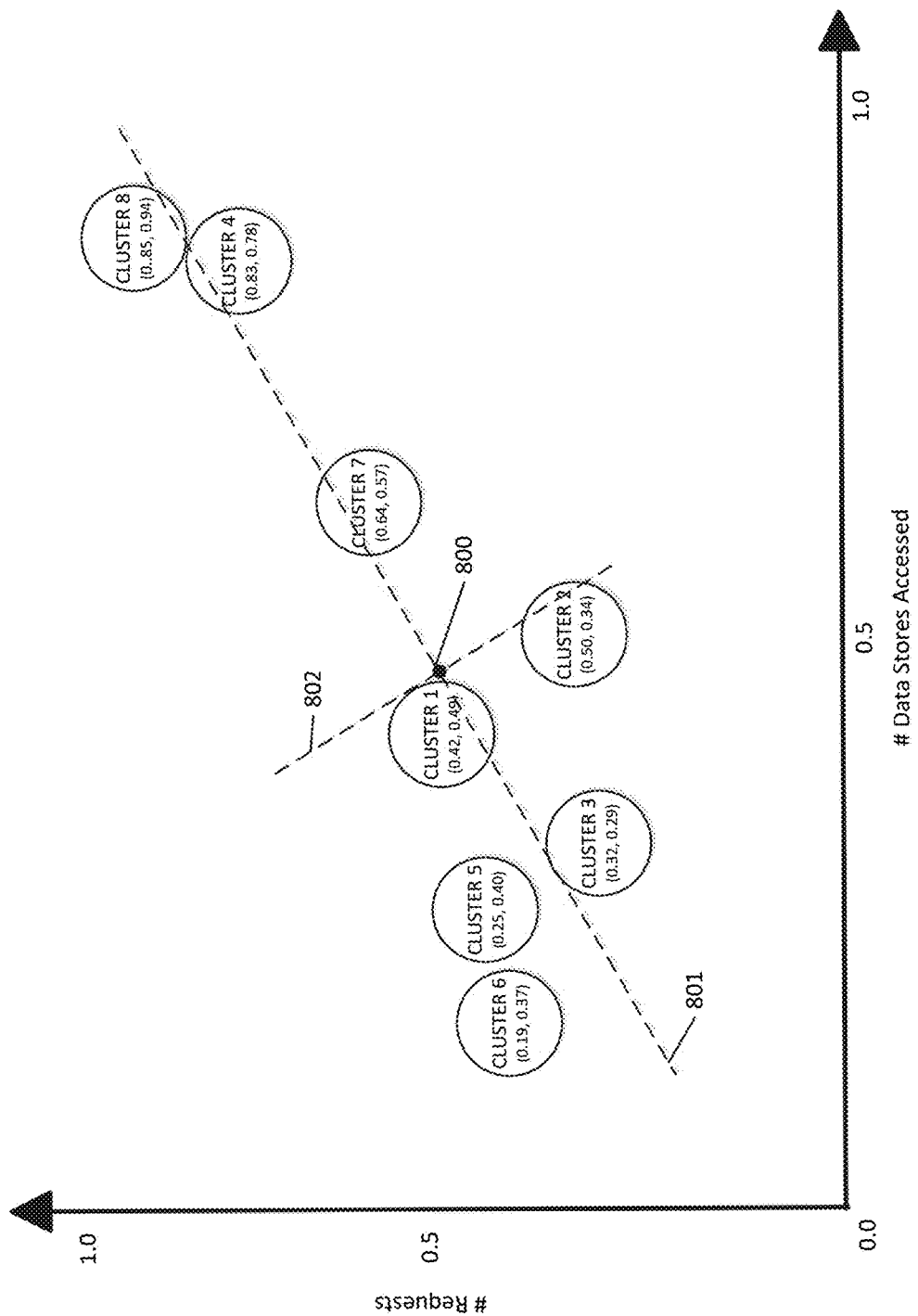
FIG. 8 illustrates a visualization of a distance-based outlier metric that can be used as an outlier metric for clusters according to an exemplary embodiment.

FIG. 8 illustrates a visualization of a distance-based outlier metric that can be used as an outlier metric for the clusters, the Mahalanobis Outlier Analysis ("MOA"). The Mahalanobis distance is a measure of the distance between a point P and a distribution D. An origin point for computing this measure is at the centroid (the center of mass) of the clusters, shown as point 800 in FIG. 8. The first coordinate axis when computing this distance, 801, extends along the spine of the clusters, which is any direction in which the variance is the greatest. The second coordinate axis, 802 extends perpendicularly to the first axis 801, with the origin point 800 at the intersection of first axis 801 and the second axis 802. Referring to FIG. 8, the Mahalanobis distance for each cluster is the distance measured relative to coordinate axes 801 and 802 from the cluster to the origin point 800.

As discussed above, distance-based outlier detection can be performed by computing Mahalanobis distance ("MD") of the clusters discovered during the clustering step. Clusters with the largest MD values—a unit-neutral measure of distance from the cluster system center of mass—are considered as the outlier candidates.

The distance-based outlier detection confidence metric can be calculated as:

$$C_{MOA} = 100 p_e / [1 - p_{crit}(\delta, n, p_e)]$$

where $p_{crit}(\delta, n, p)$—is a critical value for distinguishing between the outliers and the extremes using an algorithm proposed by P. Filzmoser. A decision is made based on a measure of difference between the empirical and the theoretical distribution in the tails of the distribution and is considered as a measure of the outliers in a collection of the clusters.

Figure 9:
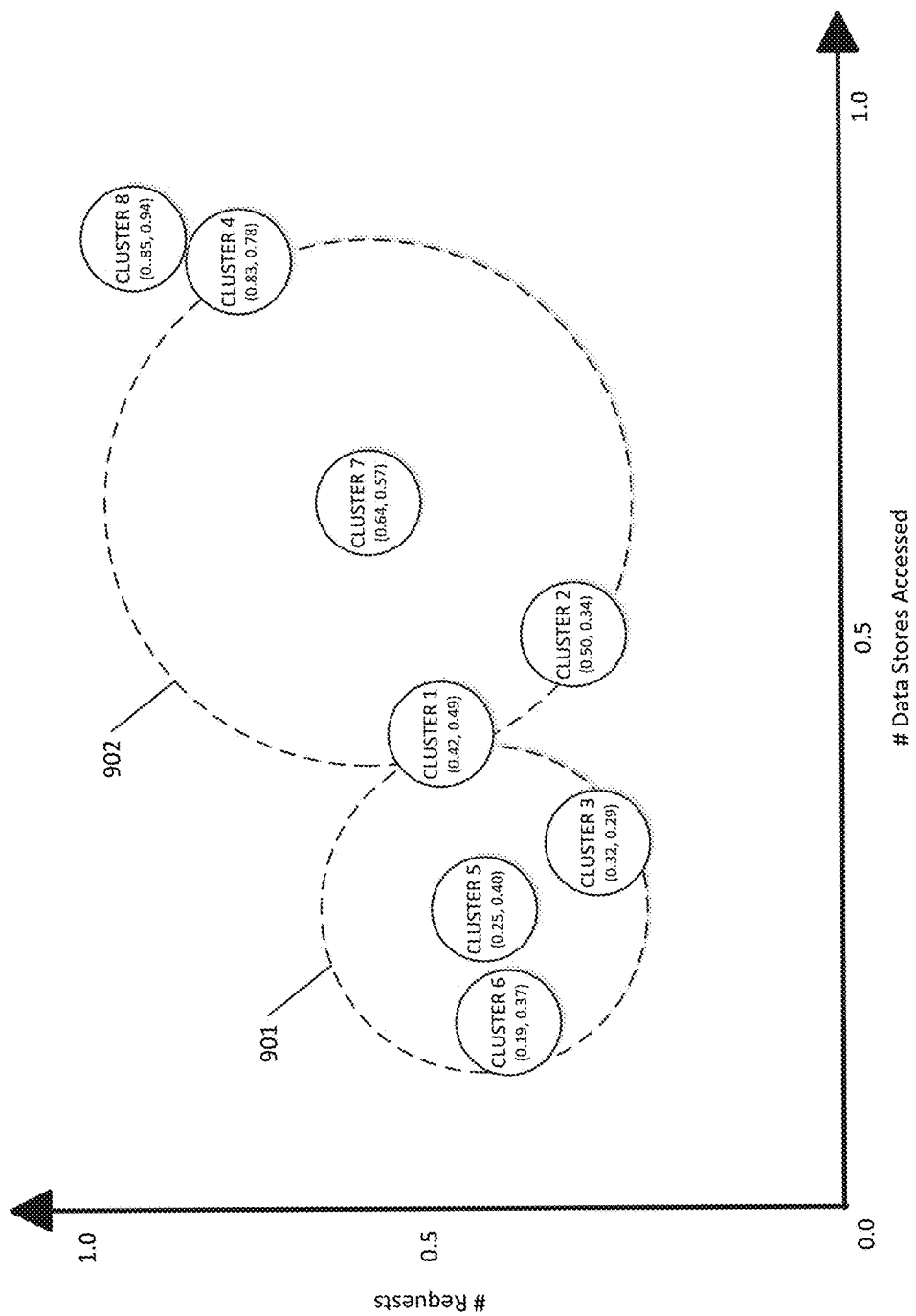
FIG. 9 illustrates visualization of a density-based outlier metric that can be used as an outlier metric for clusters according to an exemplary embodiment.

FIG. 9 illustrates visualization of a density-based outlier metric that can be used as an outlier metric for the clusters, the Local Outlier Factor ("LOF"). LOF is based on local density of clusters. The locality of each cluster is given by k nearest neighbors, whose distance is used to estimate the density. By comparing the local density of an object to the local densities of its neighbors, regions of similar density can be identified, as well as points that have a lower density than their neighbors. These are considered to be outliers.

Density-based outlier detection is performed by evaluating distance from a given node to its K Nearest Neighbors ("K-NN"). The K-NN method computes a Euclidean distance matrix for all clusters in the cluster system and then evaluates local reachability distance from the center of each cluster to its K nearest neighbors. Based on the said distance matrix local reachability distance, density is computed for each cluster and the Local Outlier Factor ("LOF") for each cluster is determined. Clusters with large LOF value are considered as the outlier candidates.

FIG. 9 illustrates a visualization of 3-NN distance for Cluster 5, which is shown as dotted circle 901 and a visualization of a 3-NN distance for Cluster 7, which is shown as dotted circle 902. As shown in the figure, the local density of Cluster 7 is much lower than the local density for cluster 5.

The density-based cluster outlier confidence metric can be computed as:

$$C_{LOF} = 100 \frac{LOF}{t_{LOF}}$$

where LOF—is a computed local outlier factor, $t_{LOF}$—an empirical LOF threshold value. Clusters with a higher computed LOF value are considered as outliers.

In addition to applying outlier detection methods such as Mahalanobis Outlier Analysis and Local Outlier Factor, another auxiliary outlier detection method can also be applied to the results of these outlier detection methods. For example, Grubbs' Test can be applied to results of the first outlier detection step with the purpose of a further quantification of the degree of irregularity of the outlying clusters.

The Grubbs' test can be used to detect a single outlier in a collection of clusters created during the clustering step. The Grubb's test can be applied for further validation of the results of the MOA and the LOF evaluations.

Grubbs' test confidence metric can be computed as:

$$C_{Grb} = 100 \frac{G}{G_{crit}}$$

where G—is a Grubbs' test statistic and $G_{crit}$—is a threshold value for rejecting the "no outliers" hypothesis (a "null hypothesis") for a one-sided test.

Application of multiple outlier detection methods to the collection of clusters produced during the clustering step enhances interpretation of the clustering step results. Although this disclosure describes three outlier detection methods, it is appreciated that only one or two of the outlier detection methods can be applied to the clustering step results.

Additionally, outlier detection methods other than MOA, LOF and Grubb's Test can be used for outlier detection. For example, Minimum Covariance Determination algorithm or a "Kernel Trick" method may be used for outlier cluster detection.

Additionally outlier detection methods can be applied to the individual data points rather than clusters. However, applying outlier detection methods to the clusters achieves a faster discovery of outlying data points than by applying outlier detection methods to each individual data object separately.

Returning to FIG. 1, at step 107 an irregularity score is calculated for each data object in the plurality of data objects based at least in part on a size of a cluster which contains the data object and the one or more outlier metrics for the cluster which contains the data object. This step assigns a measure of irregularity to each cluster identified by the clustering component. Additionally, this irregularity score can be incorporated into the collection of metrics corresponding to the data objects (the activity parameters).

The irregularity score describes a degree to which a given data object is similar to other data objects in the universe of discourse. The irregularity score conveys how close a given object is to being an anomaly in a set of similar objects. The irregularity score can fall within any range of values. For example, the irregularity score can take values between 0 and 1. In this case, an irregularity metric of 1 can correspond to a data object (or a cluster) which definitively stands out among other data objects.

Figure 10:
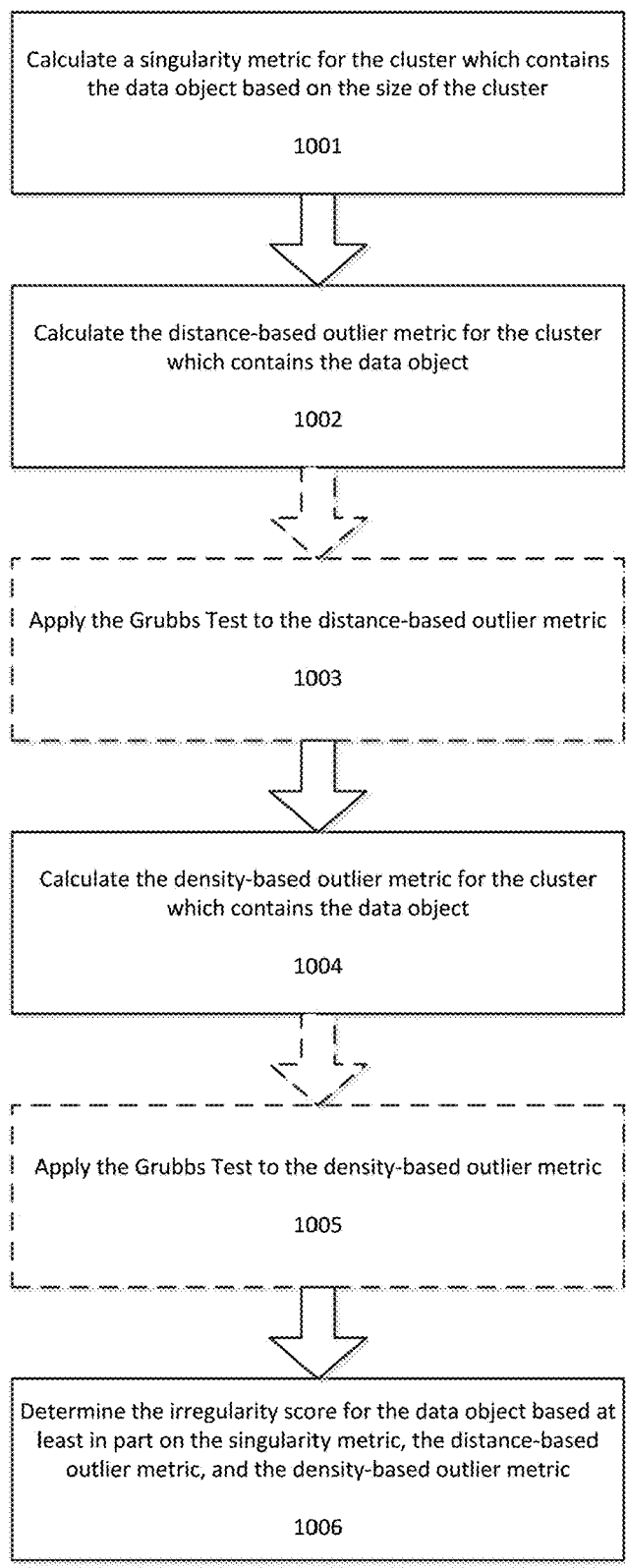
FIG. 10 illustrates a flowchart for calculating an irregularity score for each data object in the plurality of data objects based at least in part on a size of a cluster which contains the data object and the one or more outlier metrics for the cluster which contains the data object according to an exemplary embodiment.

FIG. 10 illustrates a flowchart for calculating an irregularity score for each data object in the plurality of data objects based at least in part on a size of a cluster which contains the data object and the one or more outlier metrics for the cluster which contains the data object according to an exemplary embodiment.

At step 1001 a singularity metric is calculated for the cluster which contains the data object based on the size of the cluster. The singularity metric is derived from the size of cluster in which a data object is grouped and can be determined by a singularity membership function which can map ranges of cluster sizes to various singularity metrics.

The singularity membership function describes clusters' size in terms of a singularity metric/score. The universe of discourse of the singularity membership function can be a [0, 200] interval with smaller clusters having a higher singularity metric. For example, a cluster with a single member has singularity metric of 200. Referring to FIG. 6, Cluster 6, Cluster 7, and Cluster 8 would all have a singularity metric of 200 in this example.

Alternatively, the singularity metric for a cluster can be computed from a size of the cluster using some predetermined formula or technique. For example, the sizes of all the clusters can be fit to a normalized distribution and to a certain range of values. Or the singularity metric can be based on some linear or polynomial relationship with cluster size.

At step 1002 of FIG. 10, the distance-based outlier metric for the cluster which contains the data object is calculated. As discussed earlier, the distance-based outlier metric can be the result of the Mahalanobis Outlier Analysis ("MOA") method. At step 1003, the Grubbs Test can optionally be applied to the distance-based outlier metric. As discussed earlier, application of the Grubbs Test to the distance-based outlier metric will amplify the result of the distance-based outlier metric.

At step 1004, the density-based outlier metric for the cluster which contains the data object is calculated. As discussed earlier, the density-based outlier metric can be the result of the Local Outlier Factor ("LOF") computation. At step 1005, the Grubbs Test can optionally be applied to the density-based outlier metric, which will have the effect of amplifying the result of the density-based outlier metric.

At step 1006, the irregularity score for the data object is determined based at least in part on the singularity metric, the distance-based outlier metric, and the density-based outlier metric. The function for determining the irregularity score can be denoted as:

$$I(x)=f(I_0(x), I_1(x), G_1(x), I_2(X), G_2(X))$$

where:
x is a data object in question;
$I_0(x)$ is a data object's x singularity metric derived from the size of the cluster in which the data object x is grouped during the clustering step;
$I_1(x)$, $I_2(X)$ are confidence metrics computed by the distance-based and the density-based outlier determinations respectively; and
$G_1(X)$, $G_2(X)$ are confidence metrics computed by the Grubb's test applied to the distance-based and the density-based outlier determinations respectively.

Figure 11:
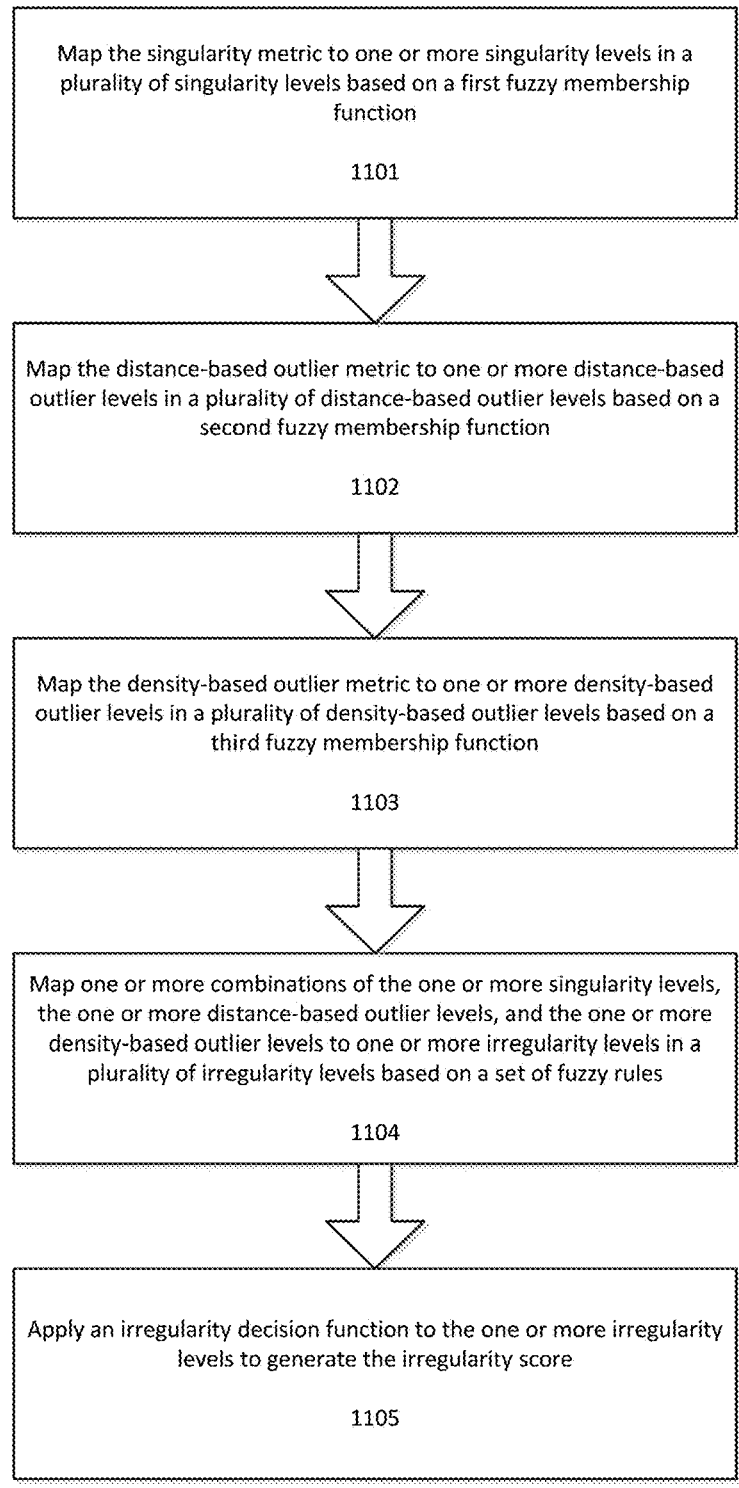
FIG. 11 illustrates a flowchart for determining the irregularity score for a data object based at least in part on the singularity metric, the distance-based outlier detection confidence metric, and the density-based outlier detection confidence metric according to an exemplary embodiment according to an exemplary embodiment.

As is discussed with reference to FIG. 11, the irregularity score I(x) can be determined based on fuzzy inferences. FIG. 11 illustrates a flowchart for determining the irregularity score for a data object based at least in part on the singularity metric, the distance-based outlier detection confidence metric, and the density-based outlier detection confidence metric according to an exemplary embodiment.

At step 1101 the singularity metric is mapped to one or more singularity levels in a plurality of singularity levels based on a first fuzzy membership function mapping a range of values of the singularity metric to the plurality singularity levels.

Figure 12A:
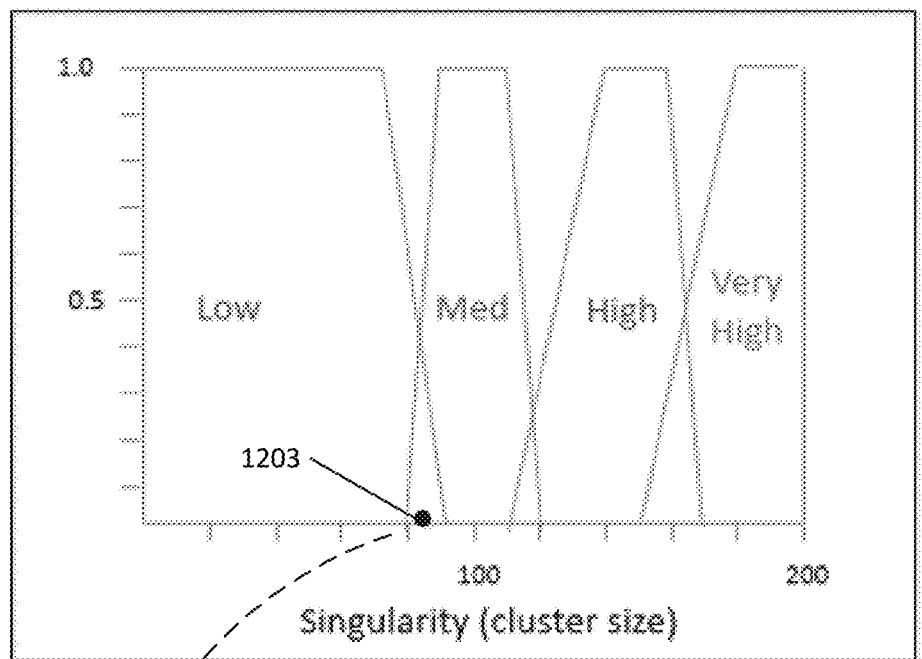
FIGS. 12A-12B illustrate a fuzzy membership function mapping a range of singularity metrics in a [0, 200] interval to a plurality of singularity levels and an example mapping according to an exemplary embodiment.
Figure 12B:
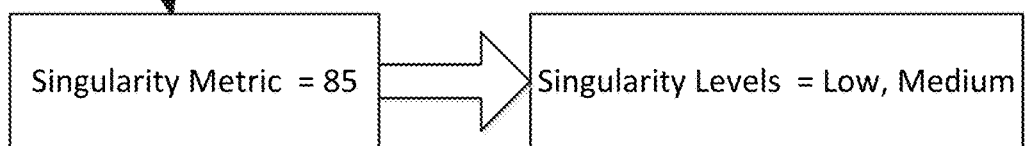

An example of this is shown in FIGS. 12A-12B. FIG. 12A illustrates a fuzzy membership function 1200 mapping a range of singularity metrics in the [0, 200] interval to a plurality of singularity levels including low, medium, high, and very high. The y-axis of the fuzzy membership function 1200 denotes a probability value. As shown in FIGS. 12A-12B, the point 1203 corresponding to a singularity metric 1201 of 85 is mapped to two singularity levels: low and medium.

At step 1102 of FIG. 11 the distance-based outlier metric is mapped to one or more distance-based outlier levels in a plurality of distance-based outlier levels based on a second fuzzy membership function mapping a range of values of the distance-based outlier metric to the plurality distance-based outlier levels. This distance-based outlier metric can be a modified distance-based outlier metric which incorporates the results of Grubbs test applied to an initial distance-based outlier metric.

Figure 13A:
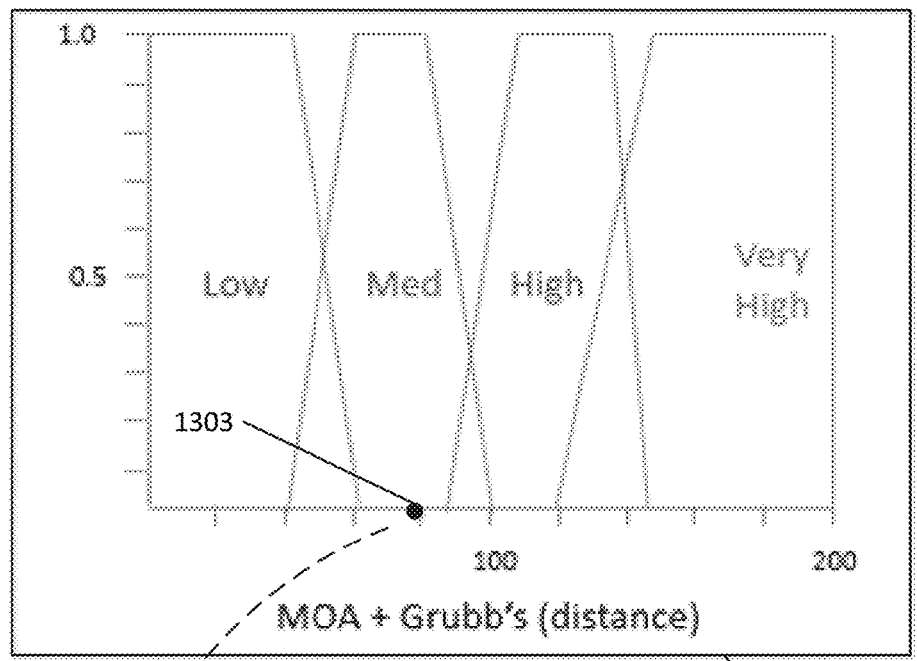
FIGS. 13A-13B illustrate a fuzzy membership function mapping a range of distance-based outlier metrics in the [0, 200] interval to a plurality of distance-based outlier levels and an example mapping according to an exemplary embodiment.
Figure 13B:
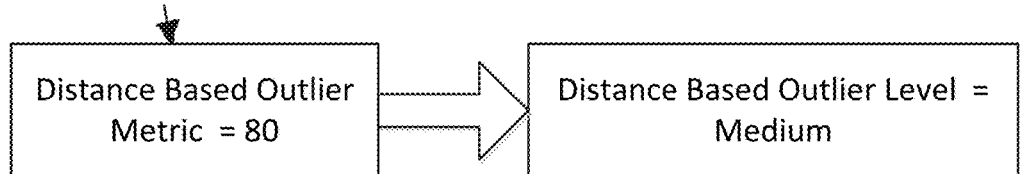

An example of this is shown in FIGS. 13A-13B. FIG. 13A illustrates a fuzzy membership function 1300 mapping a range of distance-based outlier metrics in the [0, 200] interval to a plurality of distance-based outlier levels including low, medium, high, and very high. The y-axis of the fuzzy membership function 1300 denotes a probability value. As shown in FIGS. 13A-13B, the point 1303 corresponding to a distance-based outlier metric 1301 of 80 is mapped to a distance-based outlier level of Medium.

At step 1103 of FIG. 11 the density-based outlier metric is mapped to one or more density-based outlier levels in a plurality of density-based outlier levels based on a third fuzzy membership function mapping a range of values of the density-based outlier metric to the plurality density-based outlier levels. This density-based outlier metric can be a modified density-based outlier metric which incorporates the results of Grubbs test applied to an initial density-based outlier metric.

Figure 14A:
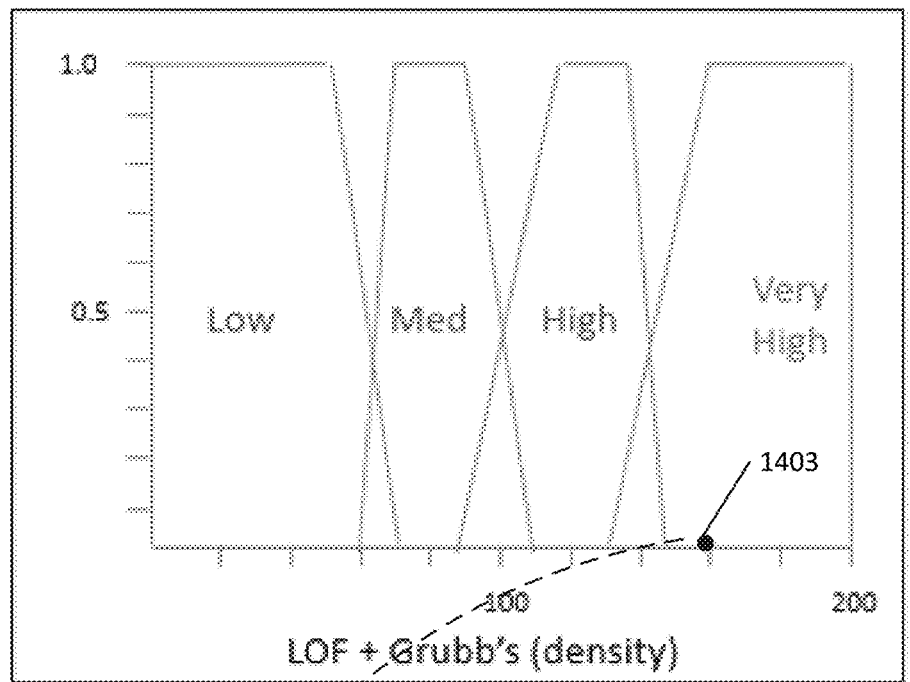
FIGS. 14A-14B illustrate a fuzzy membership function mapping a range of density-based outlier metrics in the [0, 200] interval to a plurality of density-based outlier levels and an example mapping according to an exemplary embodiment.
Figure 14B:
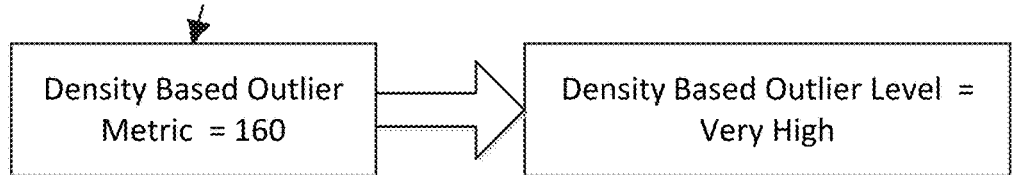

An example of this is shown in FIGS. 14A-14B. FIG. 14A illustrates a fuzzy membership function 1400 mapping a range of density-based outlier metrics in the [0, 200] interval to a plurality of density-based outlier levels including low, medium, high, and very high. The y-axis of the fuzzy membership function 1400 denotes a probability value. As shown in FIGS. 14A-14B, the point 1403 corresponding to a density-based outlier metric 1401 of 160 is mapped to a density-based outlier level of Very High.

At step 1104 of FIG. 11 one or more combinations of the one or more singularity levels, the one or more distance-based outlier levels, and the one or more density-based outlier levels are mapped to one or more irregularity levels in a plurality of irregularity levels based on a set of fuzzy rules mapping combinations of the plurality of singularity levels, the plurality of distance-based outlier levels, and the plurality of density-based outlier levels to the plurality of irregularity levels.

The set of fuzzy rules can be the following format:

IF Singularity is x AND MOA value is y AND LOF value is z THEN Irregularity is r where x, y, z∈{very high|high|medium|low} and r∈{very high (high|medium|low|very low} are sets of linguistic variables chosen to represent the fuzzy subsets of the singularity, distance, density and irregularity metrics respectively.

Of course, other sets of fuzzy rules can be utilized and these rules are provided as an example only. For example, the set of fuzzy rules can be constructed in a different fashion by choosing an alternative mapping of the irregularity metric to linguistics variables or by choosing a different linguistic variables altogether. Additionally, the fuzzy membership functions describing used to map between metrics and fuzzy levels can be constructed based on expert input or computed using an entropy maximization approach by employing a maximum computation method such as the evolutionary algorithm.

A table 1500 illustrating a set of fuzzy rules as described above is shown in in FIG. 15. As illustrated in the table 1500, each combination of the singularity level, the distance-based outlier level, and the density-based outlier level is mapped to an irregularity level.

Figure 16:
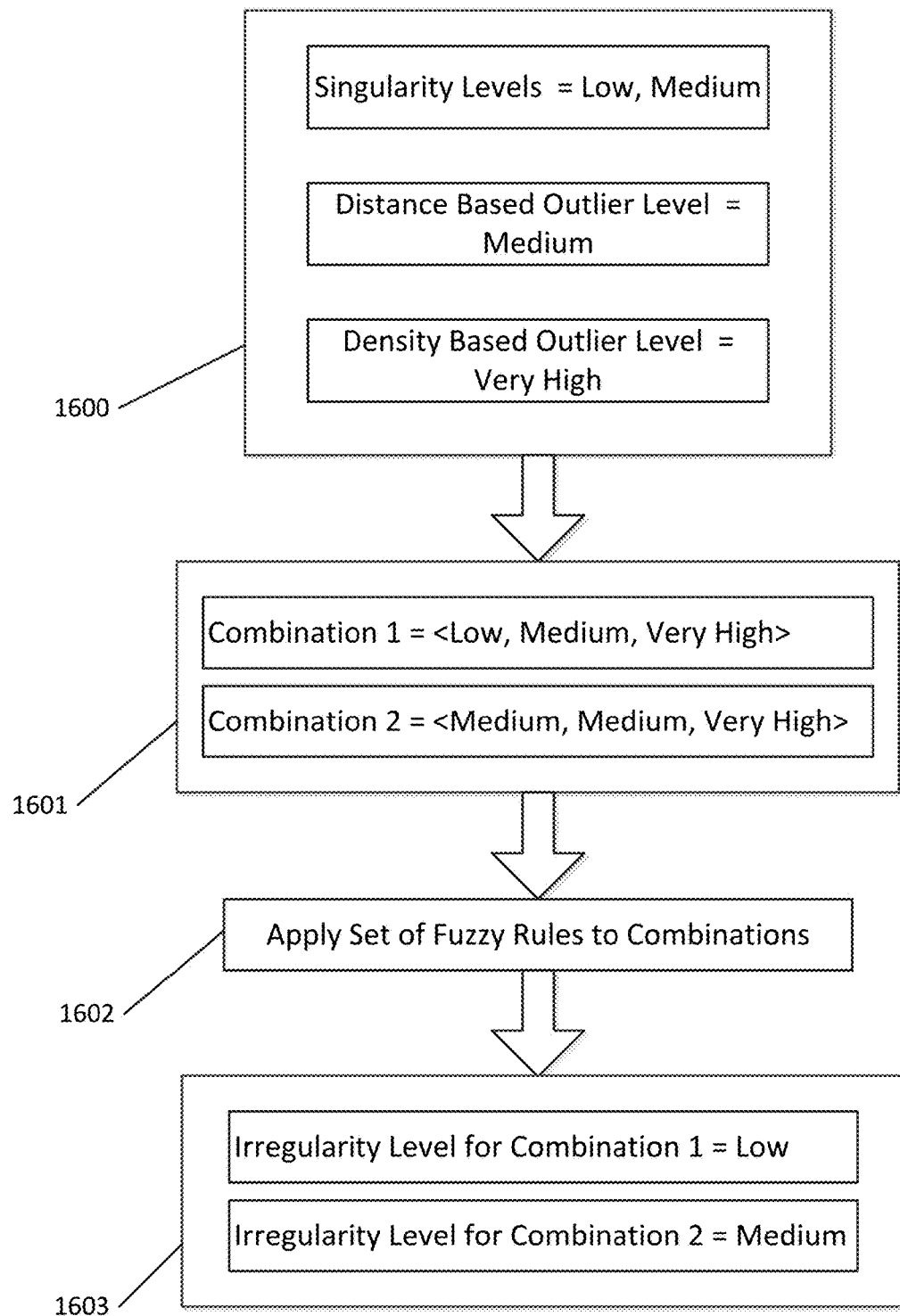
FIG. 16 illustrates a mapping using the set of fuzzy rules of FIG. 15 to a hypothetical set of data according to an exemplary embodiment.

FIG. 16 illustrates the application of step 1104 in FIG. 11, using the set of fuzzy rules of FIG. 15, to a hypothetical set of data 1600. The set of data 1600 includes the singularity levels 1202 of FIG. 12B (Low, Medium), the distance-based outlier level 1302 of FIG. 13B (Medium), and the density-based outlier level 1402 of FIG. 14B (Very High).

As shown in FIG. 16, two combinations 1601 of singularity level, distance-based outlier level, and density-based outlier level can be generated from these values. The number of combinations is simply the number of total permutations of the input level values. Since there are two singularity levels, one distance-based outlier level, and one density-based outlier level, there are 2×1×1=2 permutations=2 possible combinations of singularity levels, distance-based outlier levels, and density-based outlier levels.

At 1602 the set of fuzzy rules of FIG. 15 are applied to the two combinations. This results in two irregularity levels 1603, Low and Medium, corresponding to the first combination and the second combination, respectively.

Figure 17A:
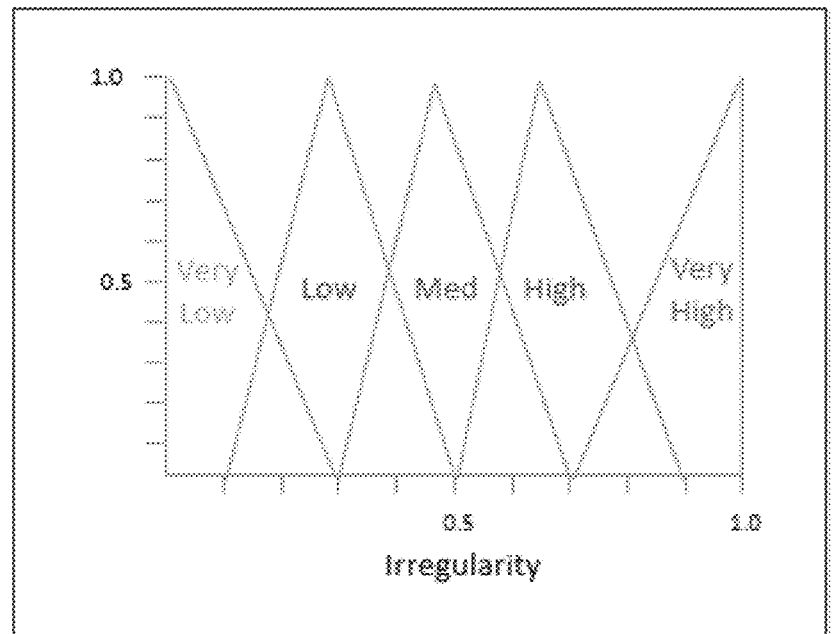
FIGS. 17A-17B illustrate an irregularity decision function and example according to an exemplary embodiment.
Figure 17B:
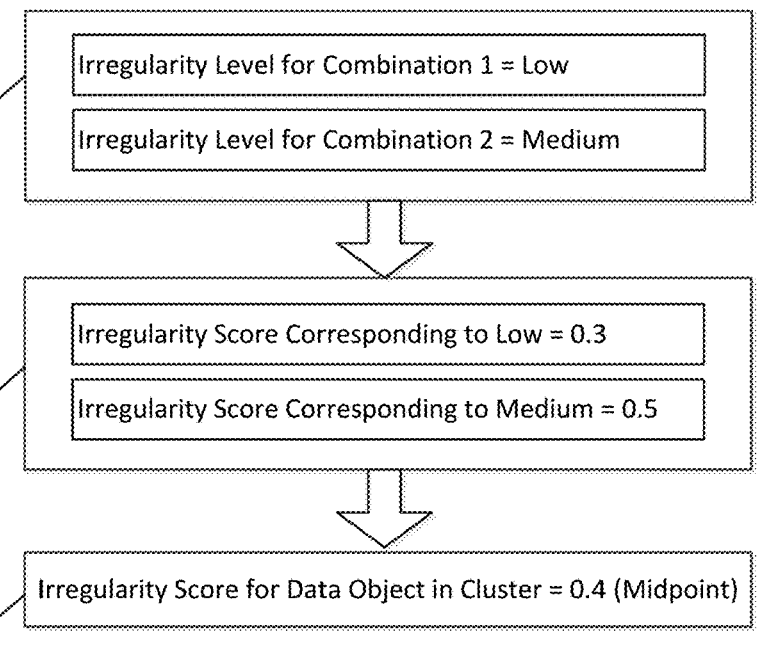

Returning to FIG. 11, at step 1105 an irregularity decision function is applied to the one or more irregularity levels to generate the irregularity score. FIG. 17A illustrates an example of an irregularity decision function 1700. As shown in FIG. 17A, the universe of discourse of the irregularity decision function 1700 is a [0, 1] interval As shown in FIG. 17B, given two irregularity levels, Low and Medium (corresponding the two irregularity levels 1603 in FIG. 16), the corresponding irregularity scores 1702 based on the irregularity decision function 1700 will be 0.3 and 0.5. This can be seen in the irregularity decision function 1700, where the irregularity score corresponding to a 100% probability of Low irregularity level is 0.3 and the irregularity score corresponding to a 100% probability of Medium irregularity level is 0.5.

Since the probability distributions for the Low irregularity level and Medium irregularity level are adjacent and of the same size, the resulting irregularity score 1703 is given by the midpoint along the irregularity score scale of these two irregularity scores. The midpoint is (0.3+0.5)/2=(0.8)/2=0.4. This will be the overall irregularity score for the data object (and for all data objects within the same cluster). The crisp output of the set of fuzzy rules—the overall irregularity metric of a data object—can be obtained using the Mamdani approach. Additionally, the crisp output of the set of fuzzy rules can be obtained using a Sugeno-type computation.

Of course, if at the end of step 1104 in FIG. 11 there was only a single irregularity level, then the overall irregularity score for the data object would just be the irregularity level corresponding to that score based on the decision function 1700 in FIG. 17.

After the overall irregularity score for each data object is determined, it can be stored with the other attributes of the data object, such as the plurality of activity parameters which characterize the data object. Alternatively, it can be stored separately but associated with one or more corresponding data object. For example, an irregularity score can be determined for each cluster at the cluster level and then each irregularity score for each cluster can be associated with all data objects grouped within that cluster.

Returning back to FIG. 1, at step 108, a plurality of object postures are generated for the plurality of data objects based at least in part on the plurality of activity parameters corresponding to each data object and the irregularity score of each data object. As each data object in the plurality of data objects corresponds to a user in a plurality of users, each generated object posture in the plurality of object postures also corresponds to a user in the plurality of users.

FIG. 18 illustrates a method that is performed for each data object in the plurality of data objects to generate a plurality of object postures for the plurality of data objects based at least in part on the plurality of activity parameters corresponding to each data object and the irregularity score of each data object according to an exemplary embodiment. As stated above, the steps in FIG. 18 are performed for each data object.

After step 107 of FIG. 1, the data object X in an n+1 dimensional space can be denoted as:

$$X=\{x_i, I\}, i=1, \ldots, n$$

where $x_i$ is an i-th activity parameter (attribute/dimension) of the data object X, and I is an overall irregularity measure computed for the data object X.

At step 1801 of FIG. 18 each activity parameter in the plurality of activity parameters is mapped to a segment value in a set of segment values and a corresponding variation value is assigned to each activity parameter based at least in part on a fuzzy membership function corresponding to that activity parameter. The fuzzy membership function corresponding to that activity parameter is configured to map possible values of that activity parameter to the set of segment values. As used herein, "map" denotes a logically linking between objects and/or data values, which can operate in both directions. For example, if an activity parameter is mapped to a segment value, then that segment value is mapped to the activity parameter as well.

At step 1802 the irregularity score of the data object is mapped to an irregularity value in a set of irregularity values and a corresponding irregularity variation value is assigned to the irregularity score based at least in part on an irregularity fuzzy membership function. The irregularity fuzzy membership function is configured to map possible values of that irregularity score to the set of irregularity values. As used herein, "map" denotes a logically linking between objects and/or data values, which can operate in both directions. For example, if an irregularity score is mapped to an irregularity value, then that irregularity value is mapped to the irregularity score as well.

The present system utilizes a unique fuzzy logic—based approach to describing posture of the data objects and tracing changes in the data objects' posture over time with the overall objective of detecting abnormal changes.

Figure 19:
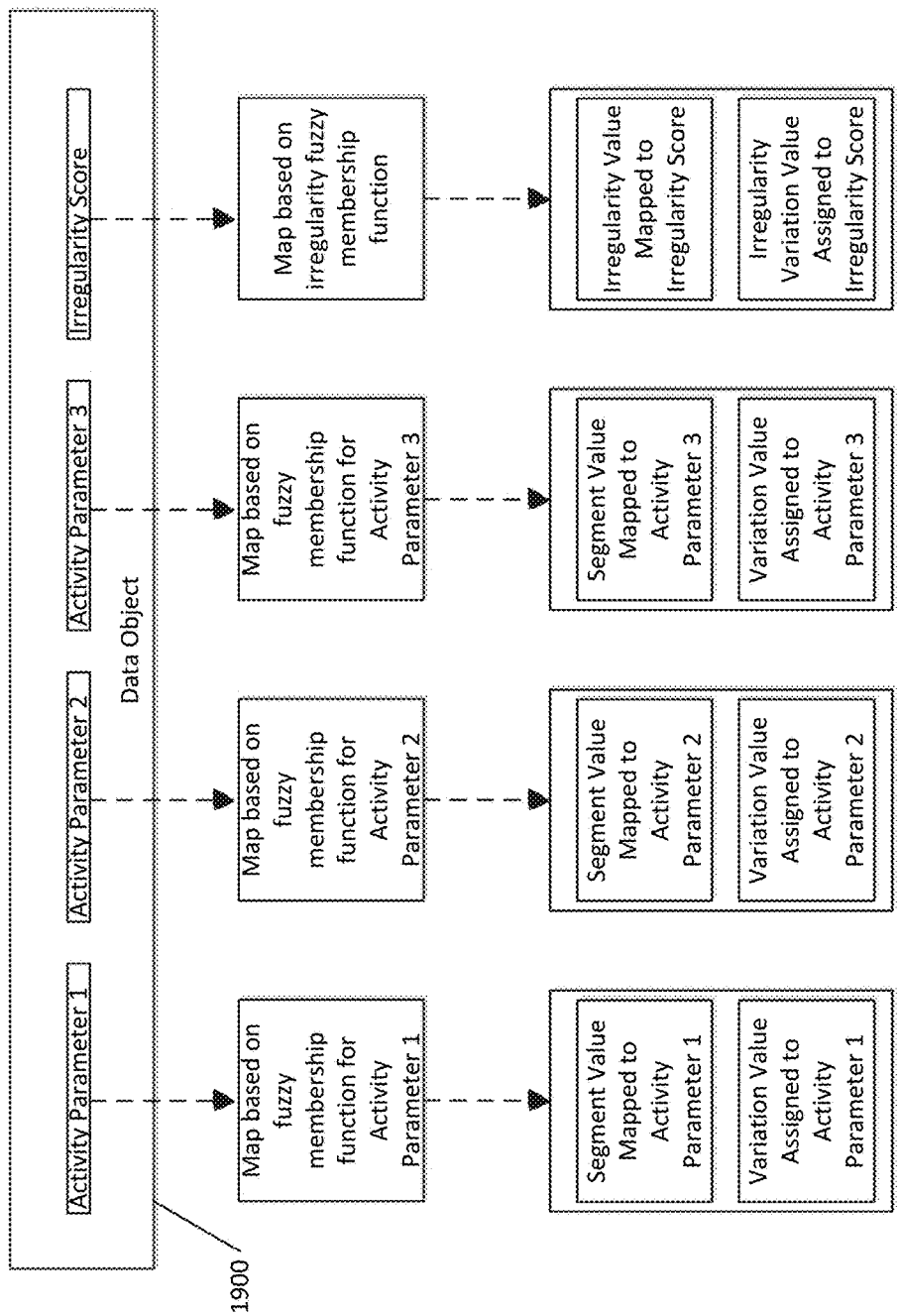
FIG. 19 illustrates a mapping of activity parameters and an irregularity score in a sample data object according to an exemplary embodiment.

An example of steps 1801 and 1802 on a sample data object 1900 are shown in FIG. 19. As shown in FIG. 19, each of the activity parameters, 1, 2, and 3, is mapped based on a corresponding fuzzy membership function. This results in a corresponding segment value being mapped to each of the activity parameters and a corresponding variation value being assigned to each of the activity parameters. Similarly, the irregularity score is mapped based on an irregularity fuzzy membership function and this results in an irregularity value being mapped to the irregularity score and an irregularity variation value being assigned to the irregularity score.

Figure 20:
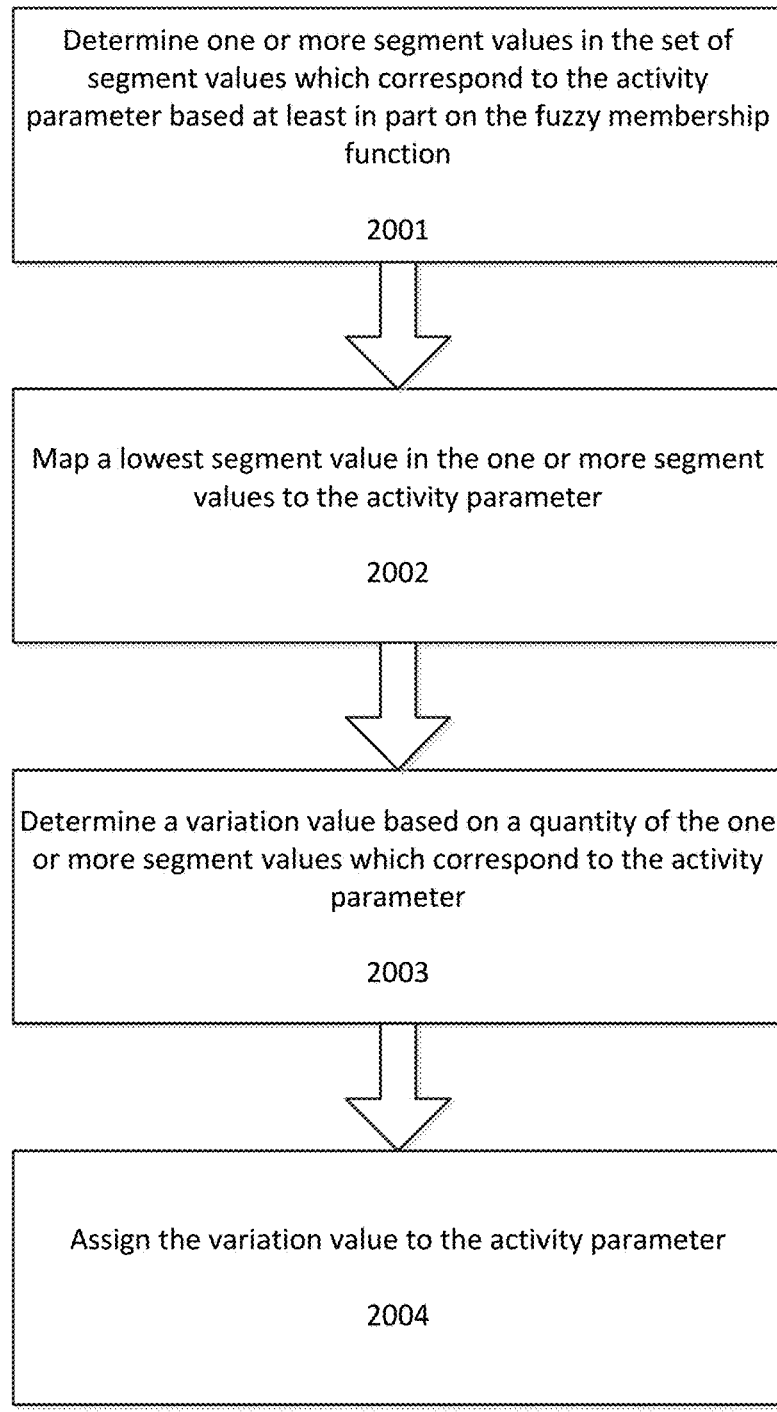
FIG. 20 illustrates a flowchart for mapping each activity parameter in the plurality of activity parameters to a segment value in a set of segment values and assigning a corresponding variation value to each activity parameter based at least in part on a fuzzy membership function corresponding to that activity parameter according to an exemplary embodiment.

FIG. 20 illustrates a flowchart for mapping each activity parameter in the plurality of activity parameters to a segment value in a set of segment values and assigning a corresponding variation value to each activity parameter based at least in part on a fuzzy membership function corresponding to that activity parameter according to an exemplary embodiment.

At step 2001 one or more segment values in the set of segment values which correspond to the activity parameter are determined based at least in part on the fuzzy membership function.

At step 2002 a lowest segment value in the one or more segment values is mapped to the activity parameter.

At step 2003 a variation value is determined based on a quantity of the one or more segment values which correspond to the activity parameter. The variation value is given by:

$$\text{Variation Value} = (\text{Quantity of the one or more segment values}) - 1$$

Therefore, if the quantity of the one or more segment values is 1, then the variation value will be 0. If the quantity of the one or more segment values is 2, then the variation value will be 1.

At step 2004 the variation value is assigned to the activity parameter.

Figure 21:
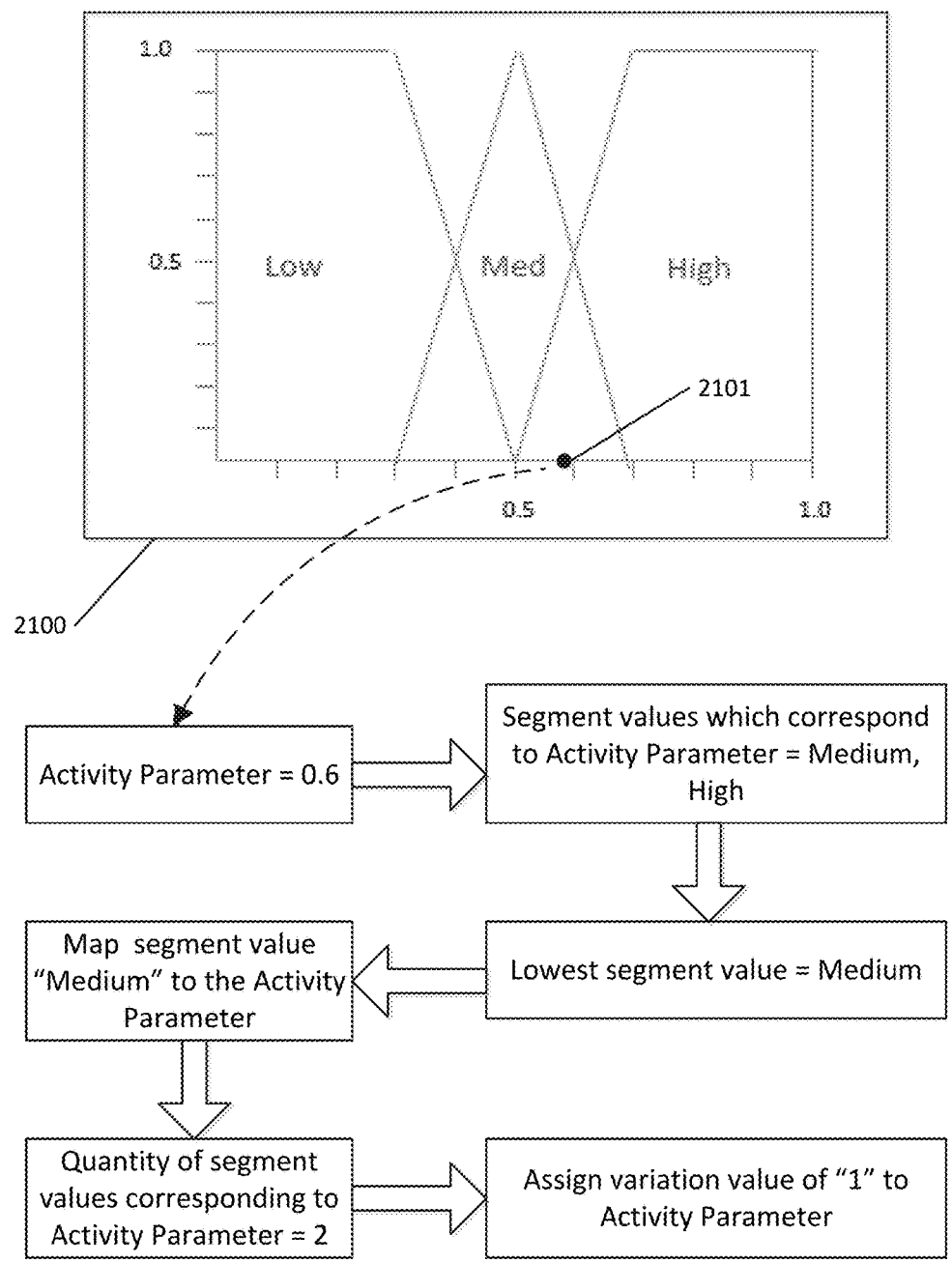
FIG. 21 illustrates an application of the steps in FIG. 20 to a sample activity parameter according to an exemplary embodiment.

FIG. 21 illustrates an example of the steps described in FIG. 20 for mapping each activity parameter in the plurality of activity parameters to a segment value in a set of segment values and assigning a corresponding variation value to each activity parameter.

As shown in FIG. 21, Activity Parameter 2101 has a value of 0.6. Based on the fuzzy membership function 2100 corresponding to that Activity Parameter 2101, segment values Medium and High correspond to the value 0.6. The lowest segment value in those segment values is Medium, so that is mapped to the Activity Parameter 2101. The quantity of segment values corresponding to the Activity Parameter 2101 is 2, so the variation value of "1" is assigned to the Activity Parameter 2101.

Figure 22:
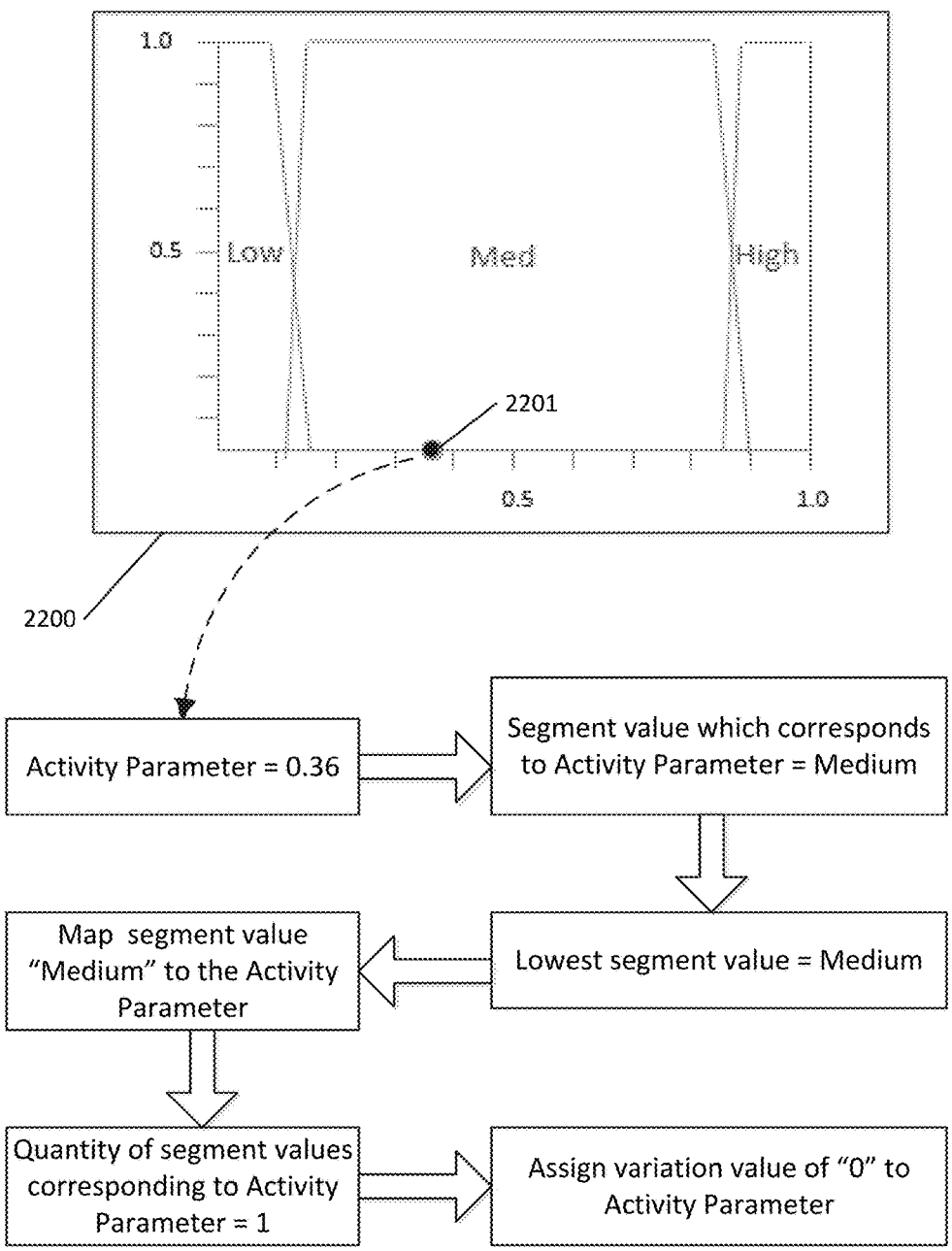
FIG. 22 illustrates an application of the steps in FIG. 20 to another sample activity parameter according to an exemplary embodiment.

FIG. 22 illustrates another example of the steps described in FIG. 20 for mapping each activity parameter in the plurality of activity parameters to a segment value in a set of segment values and assigning a corresponding variation value to each activity parameter.

As shown in FIG. 22, Activity Parameter 2201 has a value of 0.36. Based on the fuzzy membership function 2200 corresponding to that Activity Parameter 2201, segment value Medium corresponds to the value 0.36. The lowest segment value in this singleton set is Medium, so that is mapped to the Activity Parameter 2201. The quantity of segment values corresponding to the Activity Parameter 2201 is 1, so the variation value of "0" is assigned to the Activity Parameter 2201.

Figure 23:
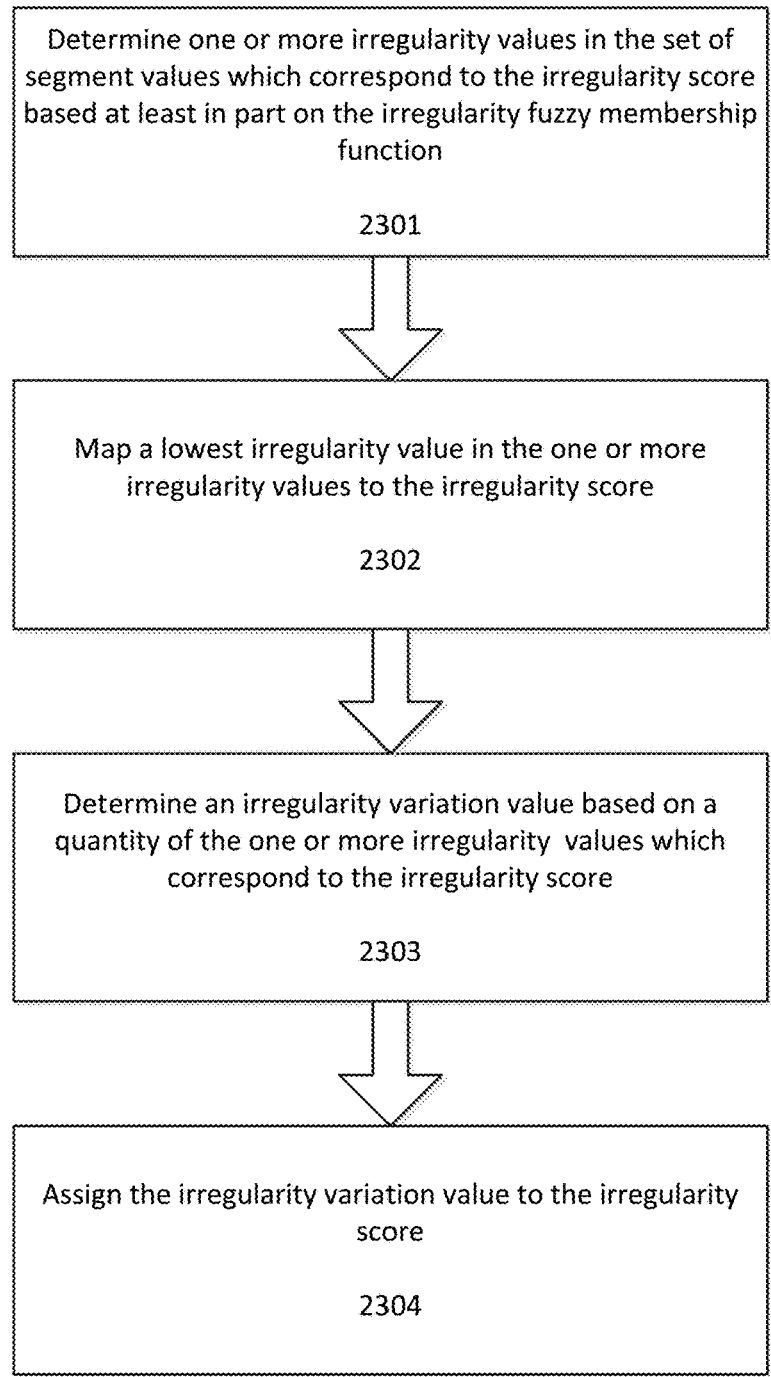
FIG. 23 illustrates a flowchart for mapping the irregularity score of the data object to an irregularity value in a set of irregularity values and assigning a corresponding irregularity variation value to the irregularity score based at least in part on an irregularity fuzzy membership function according to an exemplary embodiment.

FIG. 23 illustrates a flowchart for mapping the irregularity score of the data object to an irregularity value in a set of irregularity values and assigning a corresponding irregularity variation value to the irregularity score based at least in part on an irregularity fuzzy membership function according to an exemplary embodiment.

At step 2301 one or more irregularity values in the set of irregularity values which correspond to the irregularity score are determined based at least in part on the irregularity fuzzy membership function.

At step 2302 a lowest irregularity value in the one or more irregularity values is mapped to the irregularity score.

At step 2303 an irregularity variation value is determined based on a quantity of the one or more irregularity values which correspond to the irregularity score. The irregularity variation value is given by:

$$\text{Irregularity Variation Value} = (\text{Quantity of the one or more irregularity values}) - 1$$

Therefore, if the quantity of the one or more irregularity values is 1, then the variation value will be 0. If the quantity of the one or more irregularity values is 2, then the variation value will be 1.

At step 2304 the irregularity variation value is assigned to the irregularity score.

Figure 24:
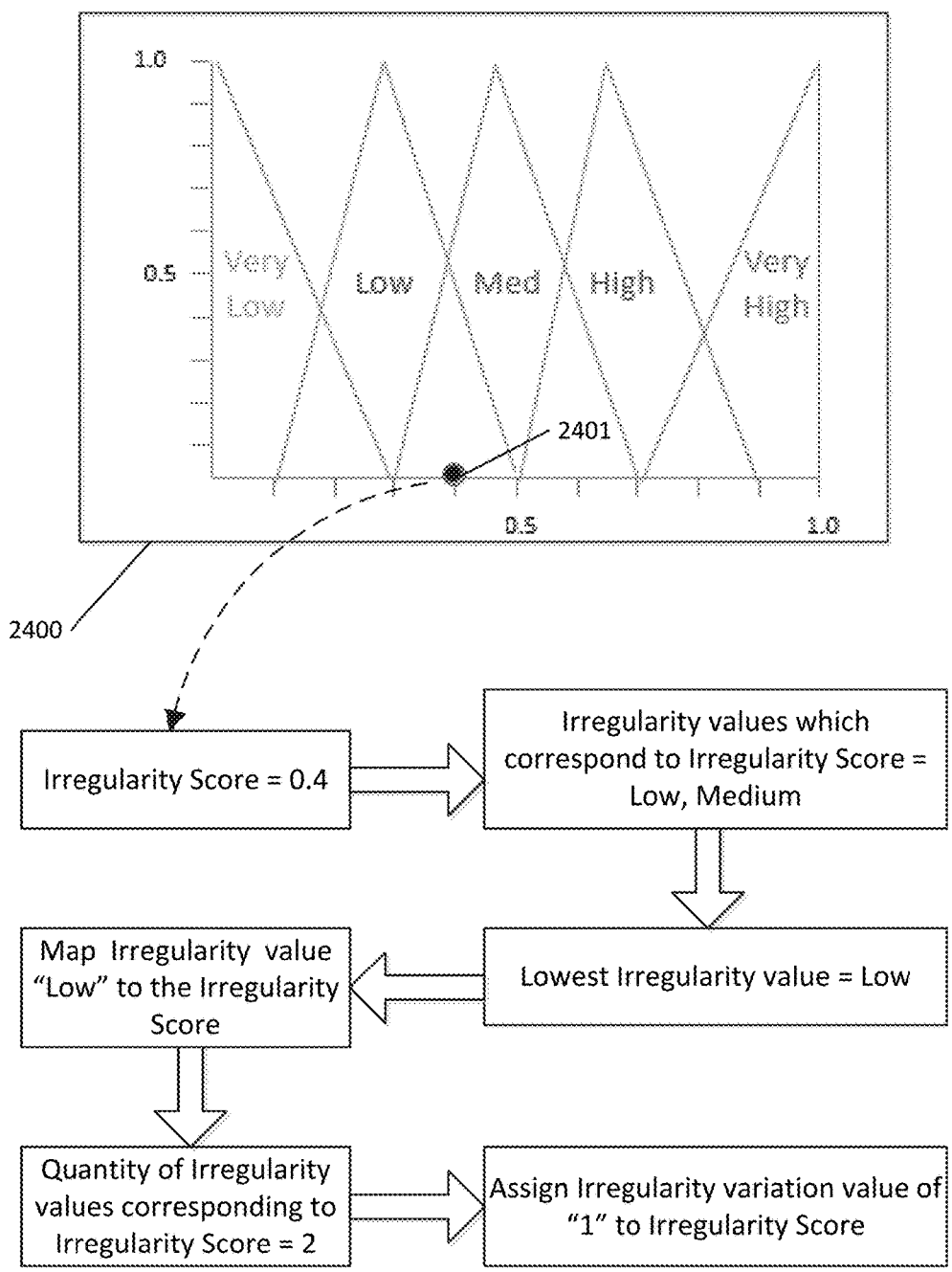
FIG. 24 illustrates an example mapping of an irregularity score to an irregularity value in a set of irregularity values and an example assignment of an irregularity variation value to the irregularity score according to an exemplary embodiment.

FIG. 24 illustrates an example of the steps described in FIG. 23 for mapping the irregularity score to an irregularity value in a set of irregularity values and assigning a corresponding irregularity variation value to the irregularity score.

As shown in FIG. 24, Irregularity Score 2401 has a value of 0.4. Based on the irregularity fuzzy membership function 2400 corresponding to the Irregularity Score 2401, irregularity values Low and Medium correspond to the value 0.4. The lowest irregularity value in those irregularity values is Low, so that is mapped to the Irregularity Score 2401. The quantity of irregularity values corresponding to the Irregularity Score is 2, so the irregularity variation value of "1" is assigned to the Irregularity Score 2401.

Returning to FIG. 18, steps 1803 and 1804 can optionally be skipped, and at step 1805, the posture of the data object is generated based at least in part on a plurality of segment values mapped to the plurality of activity parameters and the irregularity value mapped to the irregularity score. The posture can be generated by concatenating all segment values mapped to the plurality of activity parameters and all irregularity values mapped to the irregularity score.

Figure 25:
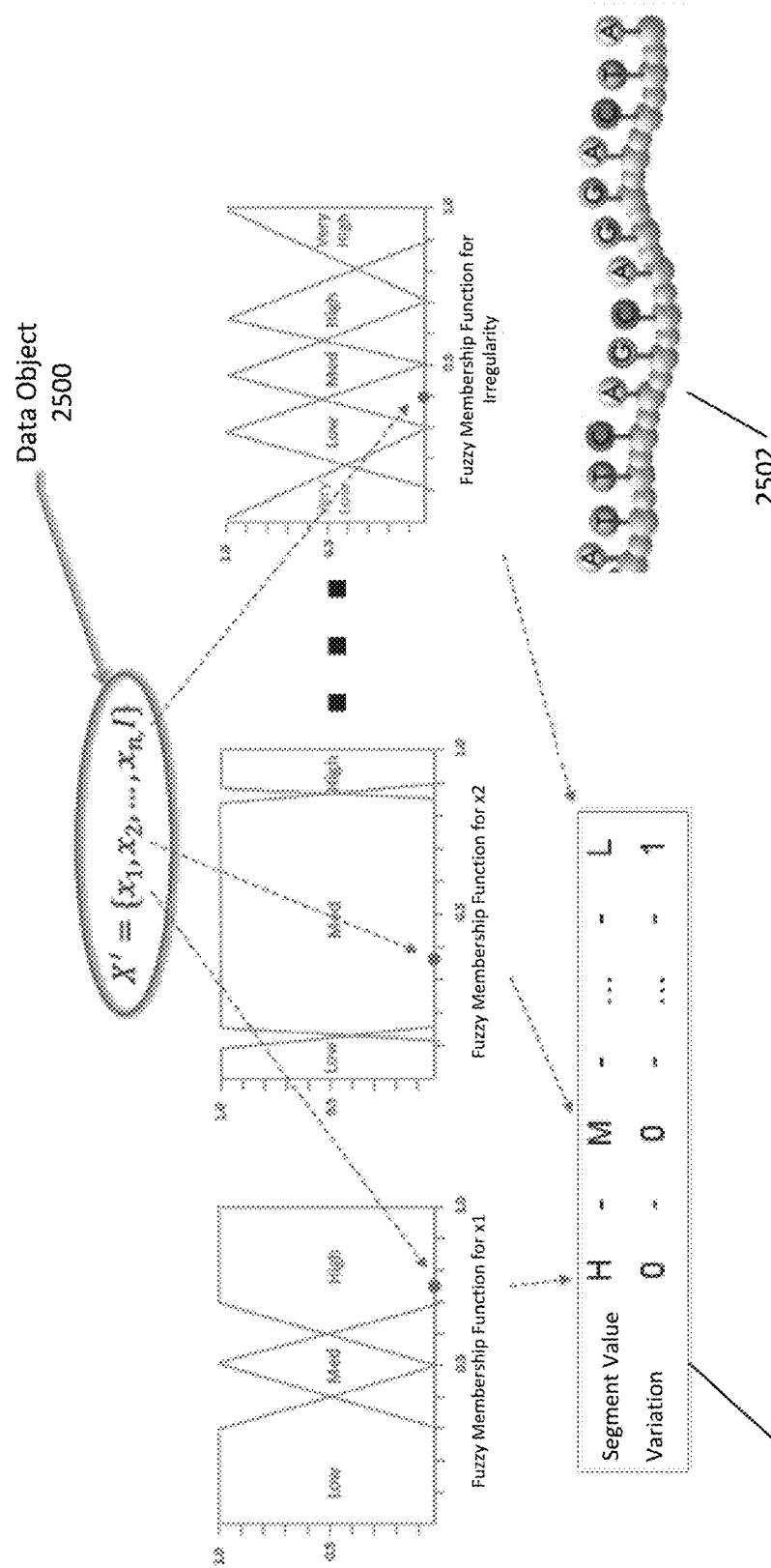
FIG. 25 illustrates an example of the posture generation process according to an exemplary embodiment.

FIG. 25 illustrates an example of this when steps 1801, 1802, and 1805 of FIG. 18 are performed. As shown in FIG. 25, Data Object 2500 has n activity parameters, denoted as $\{X_1, X_1, \ldots X_n\}$ and irregularity score I. Each of the activity parameters are mapped to segment value and assigned a variation value based on a corresponding fuzzy membership function. Additionally, the irregularity score is mapped to an irregularity value and assigned an irregularity variation value based on the irregularity fuzzy membership function.

All segment values mapped to the plurality of activity parameters and all irregularity values mapped to the irregularity score are then concatenated to generate posture 2501. As shown in FIG. 25, posture 2501 can include a sequence of variation values as well, but this is not required. The concatenated values in the posture 2501 include delimiting markers (in this case, a dash), but this is not required. Additionally, as shown, the segment values may be abbreviated to a shorter notation, such VL, L, M, H, VH corresponding to very low, low, medium, high, very high. The segment values can also be mapped to other sequences, such as integers or represented in a binary form.

Additionally, the combination of segment values and variation values and the combination of irregularity values and irregularity variation values can also be stored as bit vectors.

For example, given a set of possible segment values {Low, Medium, High}, a segment value of "Low" mapped to an activity parameter, and a variation value of "0" assigned to the activity parameter, the mapped segment value and assigned variation value for that activity parameter can be stored as the bit vector 1-0-0, where each bit corresponds to a possible segment value, a "1" indicates the presence of that value, and a "0" indicates the absence of that value.

In another example, given a set of possible segment values {Very Low, Low, Medium, High, Very High}, a segment value of "Medium" mapped to an activity parameter, and a variation value of "1" assigned to the activity parameter, the mapped segment value and assigned variation value for that activity parameter can be stored as the bit vector 0-0-1-1-0. In this case, the first "1" corresponds to the mapped segment value of "Medium" and the second "1" corresponds to the segment value of "High" which is also present since the assigned variation value is "1" and "High" is the next segment value after "Medium."

Similarly, given a set of possible irregularity values {Low, Medium, High}, an irregularity value of "Medium" mapped to an irregularity score, and an irregularity variation value of "0" assigned to the irregularity score, the mapped irregularity value and assigned irregularity variation value for the irregularity score can be stored as the bit vector 0-1-0, where each bit corresponds to a possible irregularity value, a "1" indicates the presence of that value, and a "0" indicates the absence of that value.

The sequence of segment values and irregularity values in the posture 2501 are similar in many ways to a DNA strand 2502, which is shown in FIG. 25 for comparison. The posture of data objects generated herein and shown in FIG. 25 can represent a sequence of segment values (and irregularity values) in fuzzy membership functions associated with attributes (such as activity parameters and irregularity scores) of a data object X and a sequence of counts of the overlapping fuzzy membership functions segment values (or irregularity values) with which said attribute is associated:

$P(X) = \{S(X), V(X)\}$, where $S(X) = s(x_1) - s(x_2) - \ldots - s(x_n) - s(I)$ is a base sequence and $V(X) = v(x_1) - v(x_2) - \ldots - v(x_n) - v(I)$ is a base variation, $s(x_j) = vs|s|m|l|vl$, where vs—"very small", s—"small", m—"medium", l—"large", vl—"very large"—a leftmost segment value ("base segment") of the fuzzy membership function in which attribute $x_i$ has membership.

$v(x_i) = k_i - 1$, where $k_i$ is the number of overlapping fuzzy membership function segment values (or irregularity values) in which attribute $x_i$ has membership. If $k_i > 0$ then corresponding $s(x_i)$ is a leftmost segment values of the fuzzy membership function in which attribute $x_i$ has membership.

Sequences S(X) and V(X) together can be considered to form a strand which uniquely identifies posture of the data object X.

Of course, some aspects of the approach disclosed herein may be altered. For example, a rightmost segment of the fuzzy membership function in which attribute $x_i$ has membership can be used to denote a base segment value of a fuzzy membership function or the count of overlapping membership function segment values in which attribute $x_i$ has membership may be presented in a different format.

Additionally, the segment values' or irregularity values' labels carry no special semantics and may be named differently such as "A", "B", "C", etc. It is also appreciated that the number of segment values or irregularity values in a membership function may be other than five.

The posture described above can be expressed in a simplified format by additional steps performed prior to generation of the posture. Returning to FIG. 18, at step 1803 one or more activity parameters in the plurality of activity parameters can be mapped to one or more additional segment values in the set of segment values based at least in part on one or more variation values corresponding to the one or more activity parameters and one or more fuzzy membership functions corresponding to the one or more activity parameters.

Figure 26:
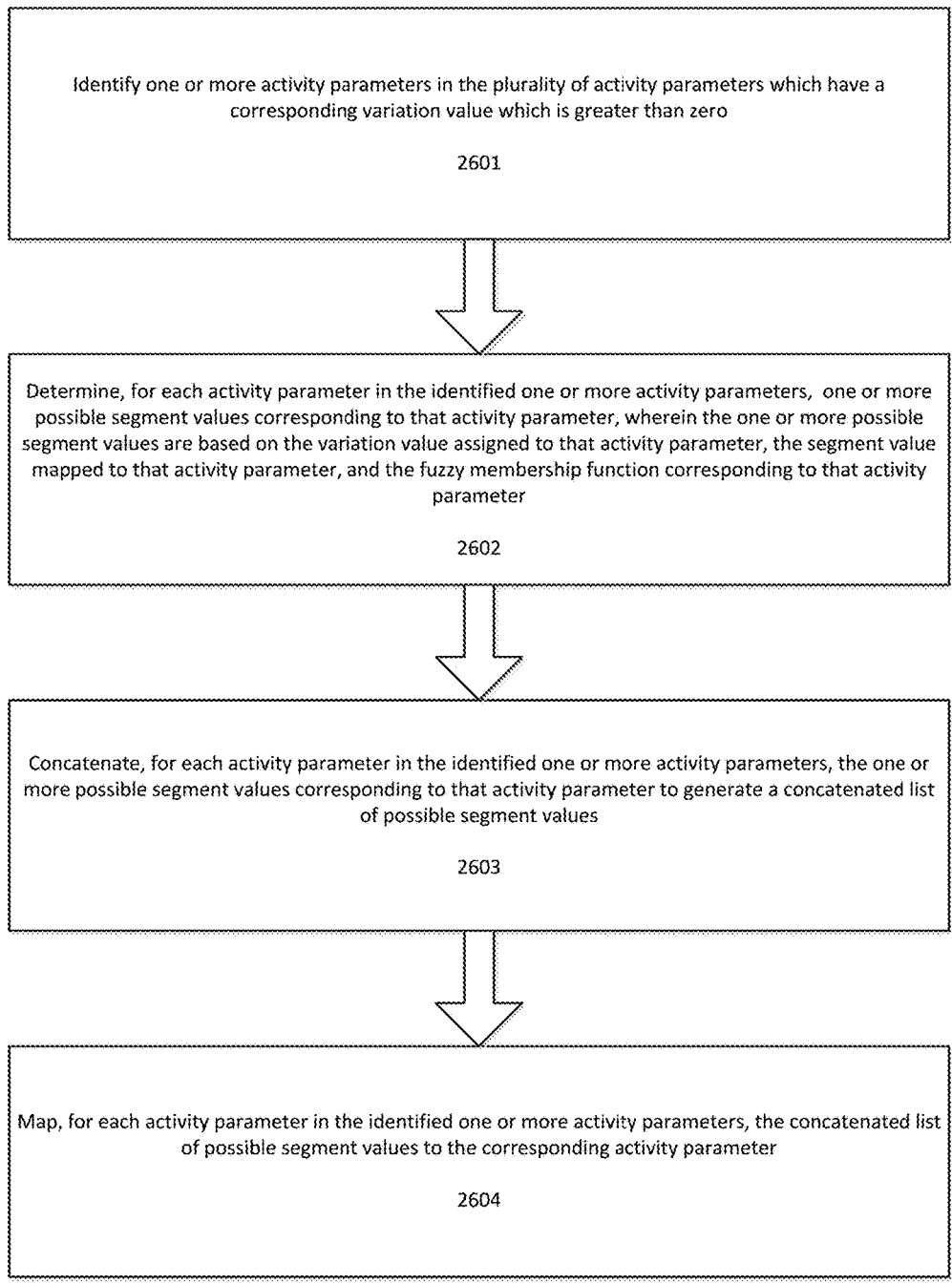
FIG. 26 illustrates a flowchart for mapping one or more activity parameters in the plurality of activity parameters to one or more additional segment values in the set of segment values based at least in part on one or more variation values corresponding to the one or more activity parameters and one or more fuzzy membership functions corresponding to the one or more activity parameters according to an exemplary embodiment.

FIG. 26 illustrates a flowchart for mapping one or more activity parameters in the plurality of activity parameters to one or more additional segment values in the set of segment values based at least in part on one or more variation values corresponding to the one or more activity parameters and one or more fuzzy membership functions corresponding to the one or more activity parameters according to an exemplary embodiment.

At step 2601 one or more activity parameters in the plurality of activity parameters are identified which have an assigned variation value which is greater than zero.

At step 2602, for each activity parameter in the one or more activity parameters, one or more possible segment values corresponding to that activity parameter are determined. The one or more possible segment values are determined based at least in part on the variation value assigned to that activity parameter, the segment value mapped to that activity parameter, and the fuzzy membership function corresponding to that activity parameter.

At step 2603, for each activity parameter in the one or more activity parameters, the one or more possible segment values corresponding to that activity parameter are concatenated to generate a concatenated list of possible segment values.

At step 2604, for each activity parameter in the one or more activity parameters, the concatenated list of possible segment values is mapped to the corresponding activity parameter.

Figure 27:
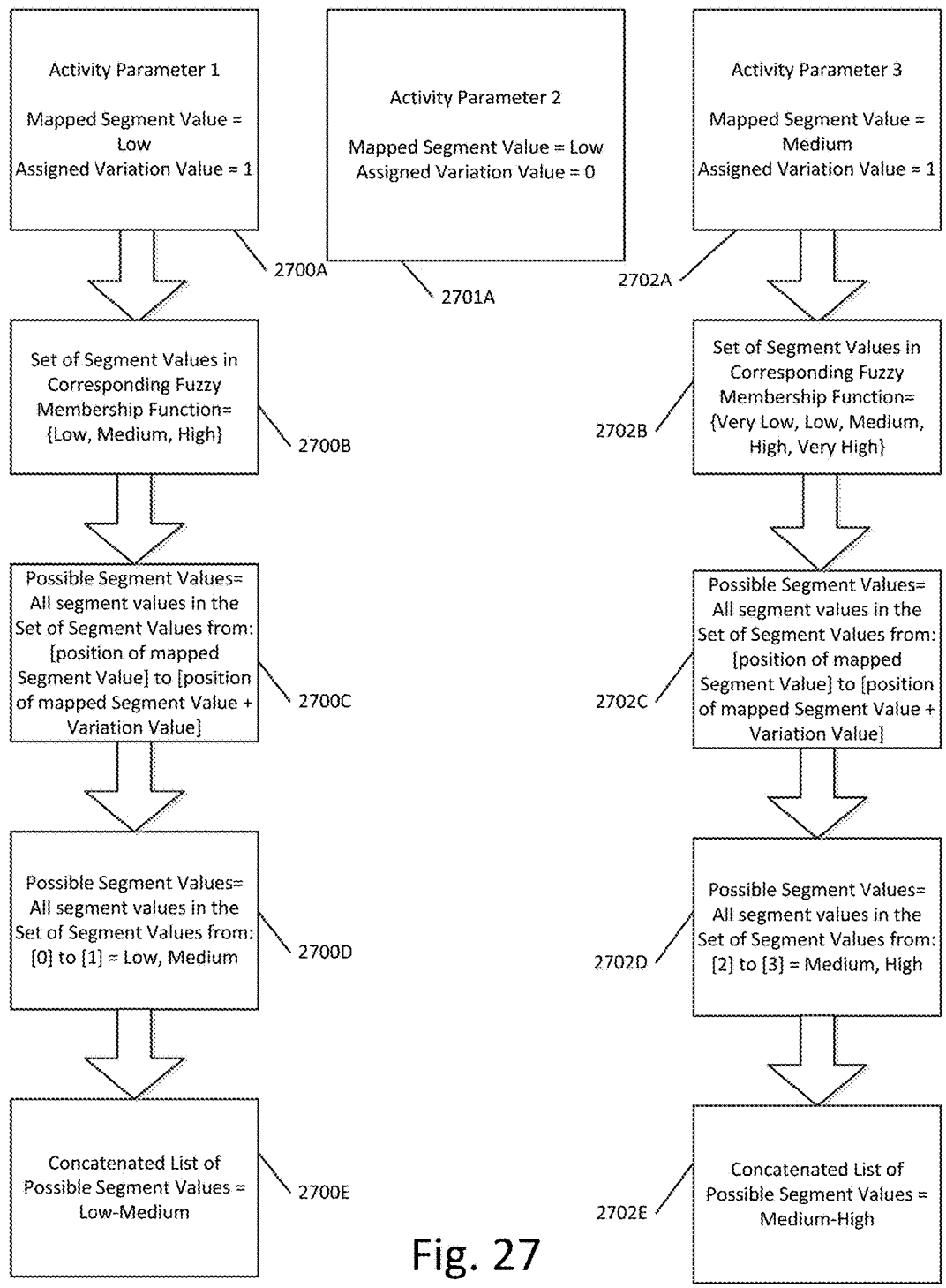
FIG. 27 illustrates an example mapping of one or more activity parameters to one or more additional segment values according to an exemplary embodiment.

FIG. 27 illustrates an example of the process illustrated in FIG. 26. Three activity parameters, 2700A, 2701A, and 2702A are shown in FIG. 27. Activity parameter 2701A has an assigned variation value which is not greater than zero, so no action is taken with regard to that activity parameter.

Activity parameters 2700A and 2702A both have an assigned variation value of 1. Therefore, one or more possible segment values for each of 2700A and 2702A are determined based at least in part on the variation value assigned to each of the activity parameters, the segment value mapped to each of the activity parameters, and the fuzzy membership function corresponding to each of the activity parameters.

The set of segment values in the corresponding fuzzy membership functions for each of 2700A and 2702A can be retrieved from the corresponding fuzzy membership functions, resulting in sets of segment values 2700B and 2702B.

The possible segment values for each of 2700A and 2702A are then determined according to the rules in boxes 2700C and 2702C. Specifically, the possible segment values for each activity parameter, 2700A and 2702A, are all segment values in the corresponding set of segment values from [the position of the mapped segment value] to [the position of the mapped segment value+the variation value].

As shown in 2700D, for activity parameter 2700A this includes the segment values in the set of segment values 2700B from position [0] (since the mapped segment value for this activity parameter is "Low") to position [1] (corresponding to 0+the variation value of 1). This results in the concatenated list 2700E including "Low-Medium."

As shown in 2702D, for activity parameter 2702A this includes the segment values in the set of segment values 2702B from position [2] (since the mapped segment value for this activity parameter is "Medium") to position [3] (corresponding to 2+the variation value of 1). This results in the concatenated list 2702E including "Medium-High."

FIG. 28 illustrates a flowchart for mapping the irregularity score to one or more additional irregularity values in the set of irregularity values based at least in part on the irregularity variation value corresponding to the irregularity score and the irregularity fuzzy membership function according to an exemplary embodiment.

At step 2801 one or more possible irregularity values corresponding to the irregularity score are determined. The one or more possible irregularity values are determined based at least in part on the irregularity variation value assigned to the irregularity score, the irregularity value mapped to the irregularity score, and the irregularity fuzzy membership function.

At step 2802 the one or more possible irregularity values corresponding to the irregularity score are concatenated to generate a concatenated list of possible irregularity values.

At step 2803 the concatenated list of possible irregularity values is mapped to the irregularity score.

Figure 29:
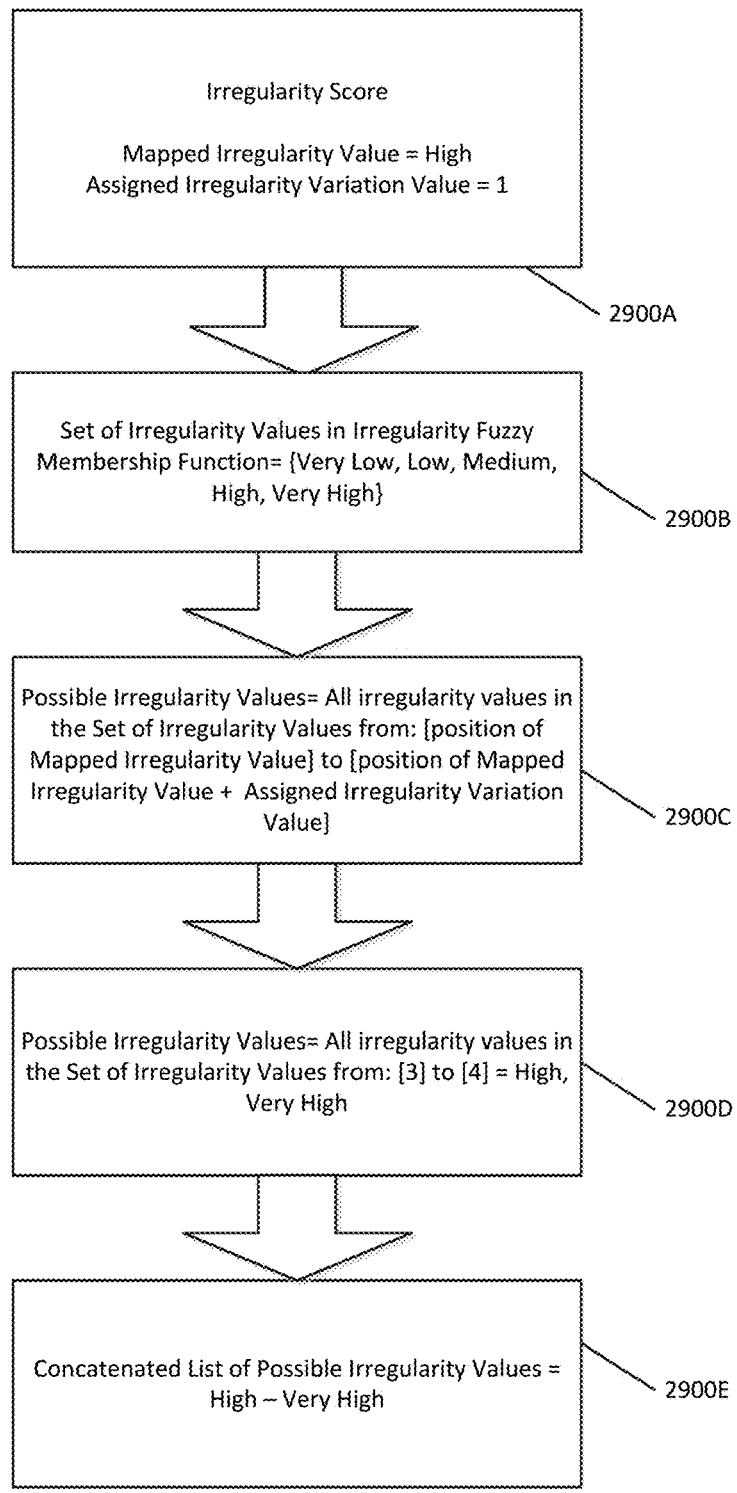
FIG. 29 illustrates an example mapping of an irregularity score to one or more additional irregularity values according to an exemplary embodiment.

FIG. 29 illustrates an example of the process illustrated in FIG. 28. Irregularity score 2900A has an assigned irregularity variation value of 1. Therefore, one or more possible segment values for irregularity score 2900A are determined based at least in part on the irregularity variation value assigned to the irregularity score, the irregularity value mapped to the irregularity score, and the irregularity fuzzy membership function.

The set of irregularity values in the irregularity fuzzy membership function for 2900A can be retrieved from the irregularity fuzzy membership function, resulting in the set of irregularity values 2900B.

The possible irregularity values for 2900A are then determined according to the rules in box 2900C. Specifically, the possible irregularity values for irregularity score 2900A are all irregularity values in the corresponding set of irregularity values from [the position of the mapped irregularity value] to [the position of the mapped irregularity value+the assigned irregularity variation value].

As shown in 2900D, for irregularity score 2900A this includes the irregularity values in the set of irregularity values 2900B from position [3] (since the mapped irregularity value for the irregularity score is "High") to position [4] (corresponding to 3+the variation value of 1). This results in the concatenated list 2900E including "High-Very High."

As a result of steps 1803 and 1804 of FIG. 18, described above, the variation values and irregularity variation value can effectively be removed from the data set for the data object by concatenating all possible variations of segment values and all possible variations of irregularity values to a base segment value or base irregularity value.

As shown in FIG. 18, step 1805 of generating the posture of the data object based at least in part on a plurality of segment values mapped to the plurality of activity parameters and the irregularity value mapped to the irregularity score can also be performed after steps 1803 and 1804, discussed above.

Additionally, as previously discussed, generating the posture of the data object based at least in part on a plurality of segment values corresponding to the plurality of activity parameters and the irregularity value corresponding to the irregularity score can include concatenating all segment values mapped to the plurality of activity parameters and all irregularity values mapped to the irregularity score.

Figure 30:
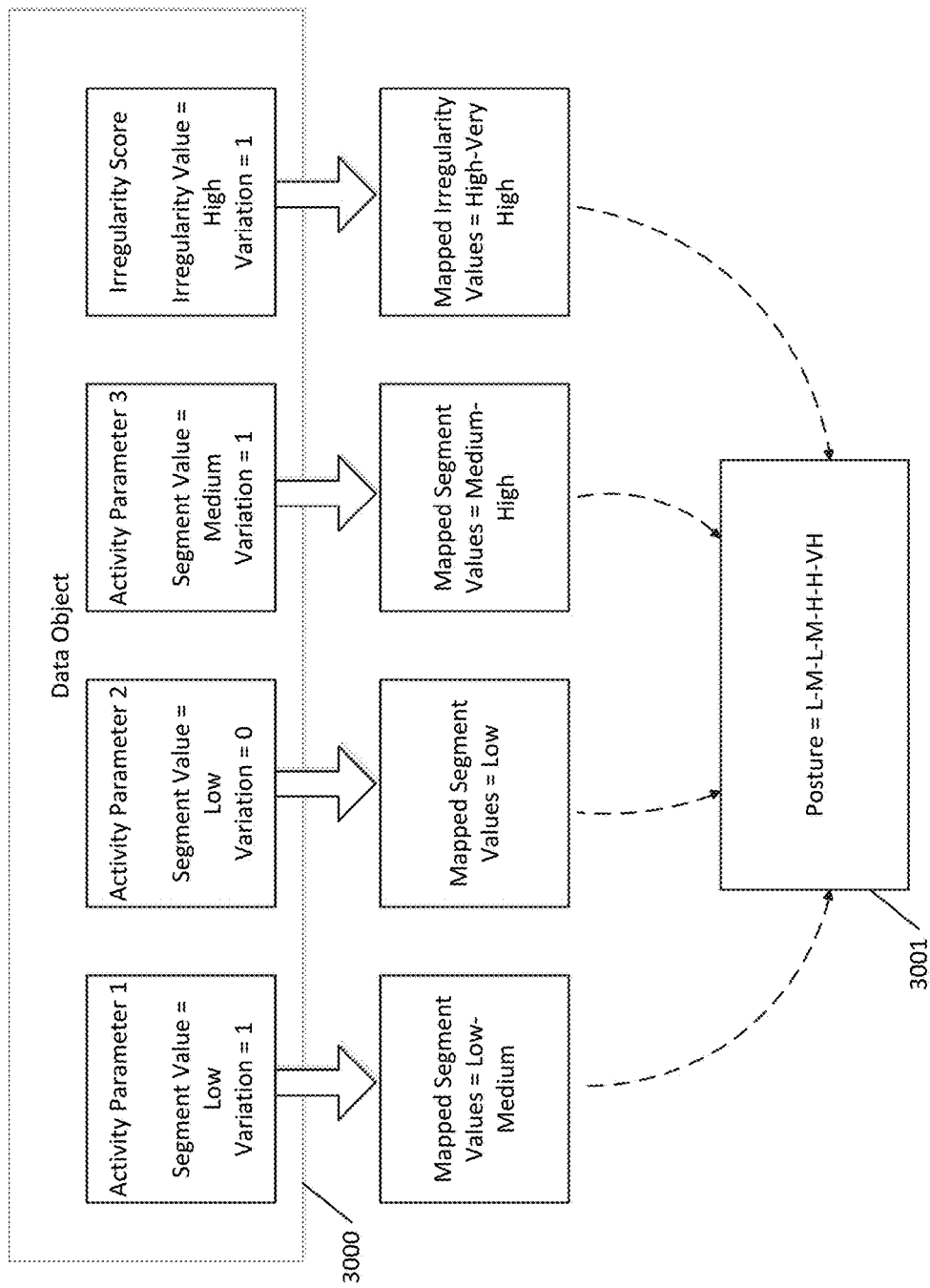
FIG. 30 illustrates an example of generating a posture after removing variation values and irregularity variation values according to an exemplary embodiment.

FIG. 30 illustrates an example of the step of generating a posture after removing the variation values and irregularity variation values by the method described with respect to steps 1803 and 1804 of FIG. 18.

Data object 3000 includes three activity parameters which correspond to the activity parameters 2700A, 2701A, and 2702A in FIG. 27. Additionally, data object 3000 includes an irregularity score which corresponds to the irregularity score 2900A in FIG. 29.

The process described with respect to FIG. 26 is applied to the three activity parameters in the data object 3000 and the process described with respect to FIG. 28 is applied to the irregularity score in the data object 3000.

As shown in FIG. 30, this results the following mapped segment values and irregularity values:

Activity Parameter 1→Low-Medium
Activity Parameter 2→Low
Activity Parameter 3→Medium-High
Irregularity Score→High-Very High Therefore, when all segment values mapped to the plurality of activity parameters and all irregularity values mapped to the irregularity score are concatenated, the resulting posture 3001 is (in abbreviated notation): L-M-L-M-H-H-VH. This simplified posture eliminates the need to keep track of the variation values and irregularity variation values and makes comparison with other postures simpler, as will be discussed below.

Returning to FIG. 1, at step 109, each object posture in the plurality of object postures is compared with one or more previous object postures corresponding to a same user as the object posture to identify anomalous activity of one or more users in the plurality of users. Each of the one or more previous object postures can correspond to a different observation interval which is prior to the observation interval for which the steps of FIG. 1 were performed. In other words, the one or more previous object postures are historic object postures relative to each object posture in the plurality of object postures.

In a case in which the data object's posture comparison with historic data component determines that the difference between a current data object's posture and its historic antecedent posture exceeds a historically observed threshold, the system can notify an input data semantics-aware component, an administrator, or some other program about a significant change in the data object's posture. The system can also invoke anomaly classification component for determining the nature of the observed deviation.

Figure 31:
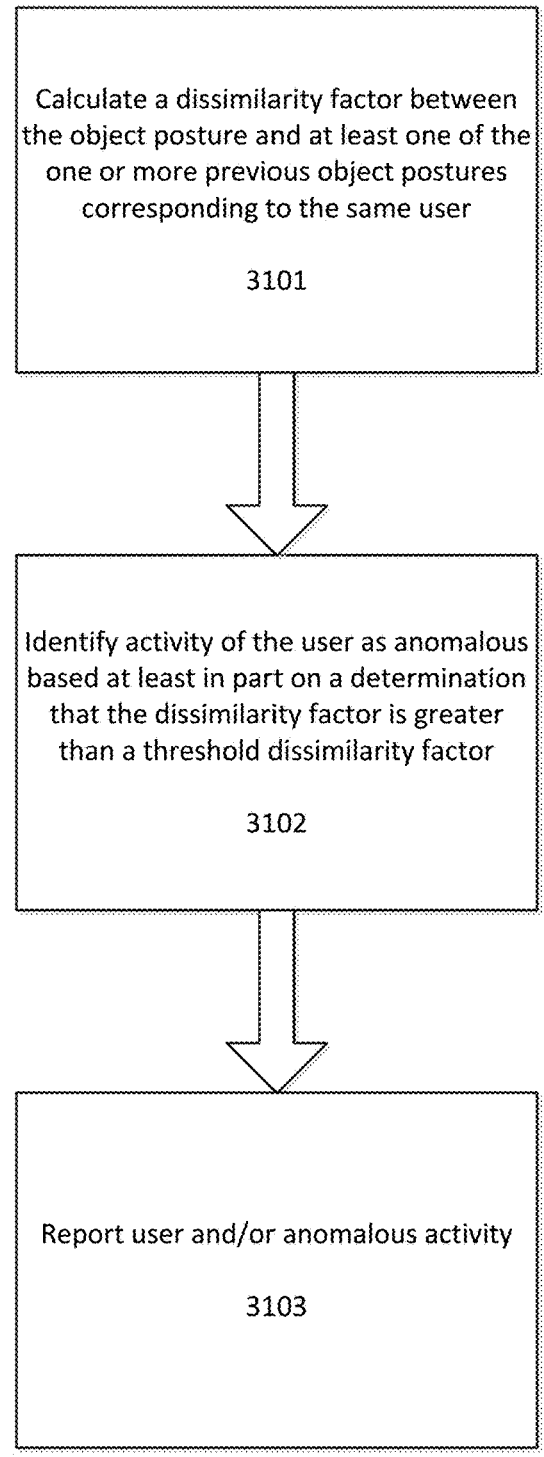
FIG. 31 illustrates a method, performed for each object posture corresponding to each user, to thereby compare each object posture in the plurality of object postures with one or more previous object postures corresponding to a same user as the object posture to identify anomalous activity of one or more users in the plurality of users according to an exemplary embodiment.

FIG. 31 illustrates a method, which can be performed for each object posture corresponding to each user, to thereby compare each object posture in the plurality of object postures with one or more previous object postures corresponding to a same user as the object posture to identify anomalous activity of one or more users in the plurality of users according to an exemplary embodiment.

At step 3101 a dissimilarity factor is calculated between the object posture and at least one of the one or more previous object postures corresponding to the same user. The dissimilarity factor can be a Levenshtein distance metric between the object posture and at least one of the one or more previous object postures corresponding to the same user.

In particular, variation between the data object's X posture at observation points $t_0$ and $t_1$ can be computed using a modification of the general Levenshtein distance metric calculation adjusted for the difference in the length of sequences produced by the strands (postures) at observation points $t_0$ and $t_1$.

Since the lengths of sequences produced by the postures vary, a method of computing a difference metric must take into account that fact.

Consider two instances of the data object X posture sequences A and B:

$$A=\{a_1, \ldots, a_n\} \text{ and } B=\{b_1, \ldots, b_n\}$$

where $a_i$, $b_j$ are resulting sequences derived from the respective strands. Dissimilarity factor, D, between sequences A and B is computed using the following formula:

$$D = \begin{cases} 0, \text{ if } \exists b_j = a_i \\ \frac{1}{n(m-1)} \sum_{i=1}^{n} \sum_{j=1, j \neq i}^{m} d(b_j, a_i), n > 0, m > 1 \end{cases}$$

where $d(b_j, a_i)$–distance between base sequences which comprise sequences B and A respectively.

It is appreciated that since size of the base sequences of the data object's X posture sequences A and B is the same and insertion and deletion operations are not required, distance between two strands can be interpreted as the Hamming distance.

It is also appreciated that different attributes comprising data object X may have different weights and provide unequal input into the dissimilarity factor, D, computation.

Figure 32:
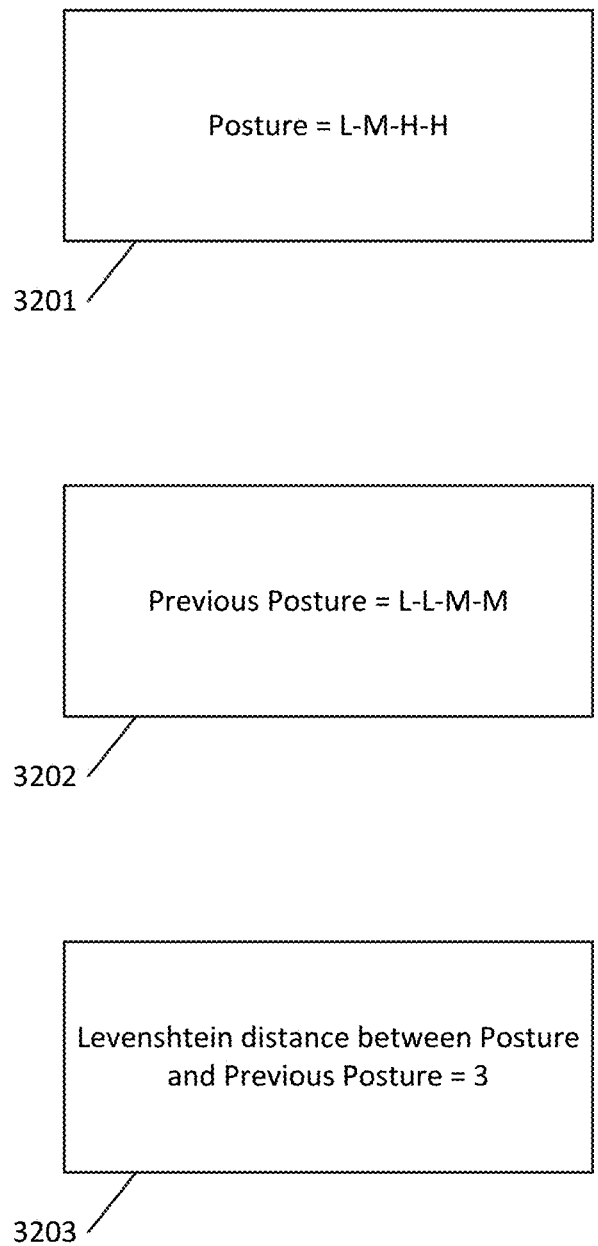
FIG. 32 illustrates the Levenshtein distance between two postures according to an exemplary embodiment.

For example, FIG. 32 illustrates the Levenshtein distance 3202 between posture 3201 and posture 3202 when substitutions are weighted equally with insertions or deletions. If the weight for substitutions were doubled, then the Levenshtein distance 3202 in this case would also double.

It is also appreciated that a distance metric other than Levenshtein distance can be used for computing dissimilarity factor. For example, a longest common subsequence method or edit distance with weights can be used for the dissimilarity factor computation.

Regardless of how the dissimilarity factor is determined, at step 3102 of FIG. 31, activity of the user is identified as anomalous based at least in part on a determination that the dissimilarity factor is greater than a threshold dissimilarity factor. This threshold dissimilarity factor can be determined based on historical analysis of variations in postures, set by experts, or computed by some other means. An anomalous change in the data point's posture can be reported or other actions can be taken when the dissimilarity factor value exceeds a certain statistically computed threshold. It is appreciated that other methods such as a change point detection algorithm or a preset threshold may be used to detect an anomalous change in the dissimilarity factor value. For example, the CUSUM algorithm or a wavelet transform may be used for that purpose.

When the statistical analysis approach is engaged the mean and the standard deviation of the dissimilarity factor value over the observation interval are computed. Assuming normal distribution of the dissimilarity factor value, data collection intervals on which computed standard deviation is outside of the 95 percentile can be considered to be anomalous and become subject to reporting or other actions.

At step 3103, if the dissimilarity factor is greater than a threshold dissimilarity factor, one or more actions can be taken. These actions can include an alert or warning message or notification. Additionally, these actions can include transmitting the data for further analysis or reporting. These actions can also include performing additional computations regarding additional postures related to one or more users for which the anomalous data was identified.

The concept of a dissimilarity factor introduced in this application provides a foundation for detecting long lasting temporal changes in a data object's behavior. In particular, a list of strands describing historic data object's postures recorded during previous N data collection intervals can kept. This bigger time interval comprises an observation interval. The duration of the observation interval can be configurable as a multiple of between 20 and 40 collection intervals. Once configured, the duration of the observation interval can be constant and the observation interval can function as a sliding window covering N most recent collection intervals.

At the end of each collection interval a dissimilarity factor between adjacent strands (postures) within the observation interval can be computed and a decision about an anomaly in the data object's posture is made. Additionally, the data object's posture tracking can be extended over a longer time periods with the objective of obtaining a forensic or a regulatory driven insight into the data object's posture. For example, hourly, daily, weekly, etc. records of the data object's posture may be kept and studied at a later time. The notion of a "posture" which includes a "strand" and a "sequence" described in this invention closely resemble similar notions related to the nucleic acid sequence within a DNA molecule and provides a foundation for describing a data object's posture as a data object's DNA and tracing of changes in the data object's posture may be termed as evolution of the data object in question.

Figure 33:
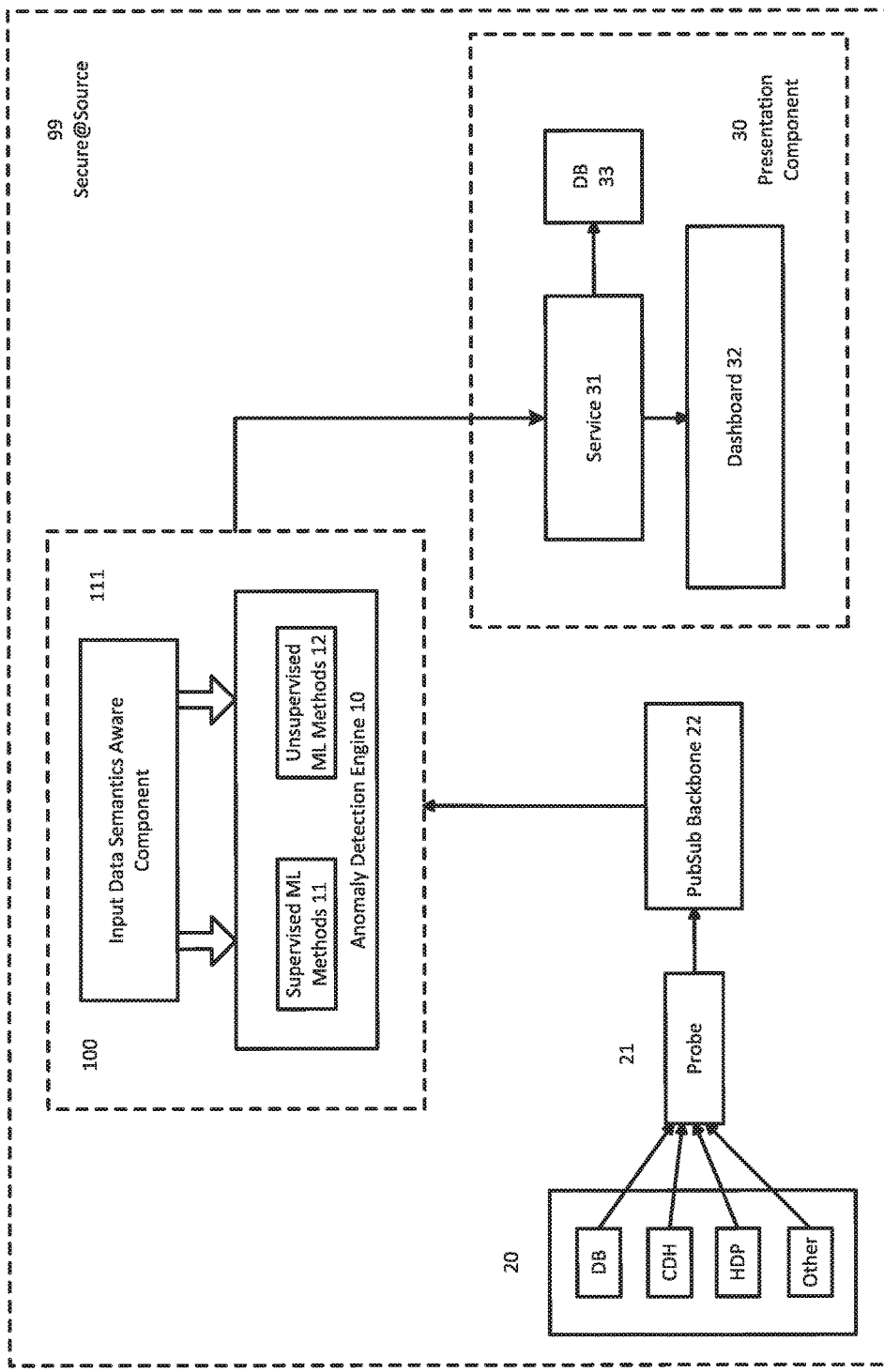
FIG. 33 illustrates a deployment of a User Behavior Anomaly module according to an exemplary embodiment.

FIG. 33 illustrates deployment of a User Behavior Anomaly ("UBA") module 100 as a component of the Informatica Secure@Source product 99. In this deployment scenario a Probe module 21 collects user activity information from various data sources 20 such as, without limitation, may be a SQL or non-SQL database (DB), Cloudera Hadoop file system (CDH), HortonWorks Hadoop file system (HDP) and other types of data stores.

Further referring to FIG. 33, the Probe module 21 publishes observed user activities information on a publish/subscribe backbone 22 ("PubSub Backbone"). User activities information is then retrieved by the UBA module 100 for processing. The UBA module 100 is comprised of the Input Data Semantics Aware Component ("Application") 111 and a general purpose Anomaly Detection Engine ("ADE") 10 library. The ADE library 10 is split logically into two sections: one containing Supervised Machine Learning ("ML") Methods 11 and second containing Unsupervised ML Methods 12 algorithms implementations.

As shown on FIG. 33, after completing user activity information processing the Application module 111 forwards results to the Service component 31 of the Presentation Component 30. The Service component 31 forwards results of the anomaly detection process to the system console Dashboard 32 and saves said results in a database (DB) 33 for the forensics and future reference purposes.

Figure 34:
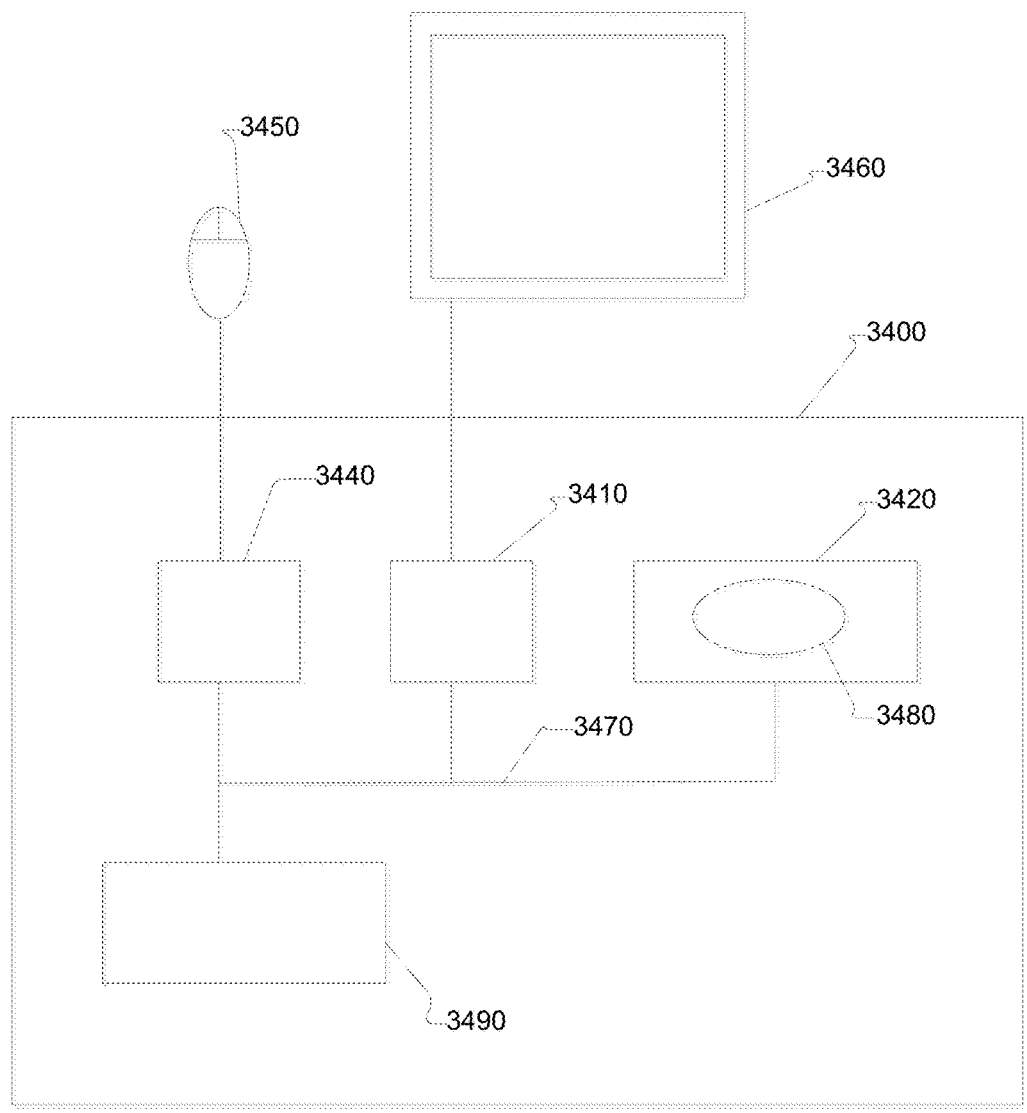
FIG. 34 illustrates an exemplary computing environment that can be used to carry out the method for detecting anomalous user behavior according to an exemplary embodiment.

One or more of the above-described techniques can be implemented in or involve one or more computer systems. FIG. 34 illustrates a generalized example of a computing environment 3400. The computing environment 3400 is not intended to suggest any limitation as to scope of use or functionality of a described embodiment.

The computing environment 3400 includes at least one processing unit 3410 and memory 3420. The processing unit 3410 executes computer-executable instructions and can be a real or a virtual processor. In a multi-processing system, multiple processing units execute computer-executable instructions to increase processing power. The memory 3420 can be volatile memory (e.g., registers, cache, RAM), non-volatile memory (e.g., ROM, EEPROM, flash memory, etc.), or some combination of the two. The memory 3420 can store software 3480 implementing described techniques.

A computing environment can have additional features. For example, the computing environment 3400 includes storage 3440, one or more input devices 3450, one or more output devices 3460, and one or more communication connections 3490. An interconnection mechanism 3470, such as a bus, controller, or network interconnects the components of the computing environment 3400. Typically, operating system software or firmware (not shown) provides an operating environment for other software executing in the computing environment 3400, and coordinates activities of the components of the computing environment 3400.

The storage 3440 can be removable or non-removable, and includes magnetic disks, magnetic tapes or cassettes, CD-ROMs, CD-RWs, DVDs, or any other medium which can be used to store information and which can be accessed within the computing environment 3400. The storage 3440 can store instructions for the software 3480.

The input device(s) 3450 can be a touch input device such as a keyboard, mouse, pen, trackball, touch screen, or game controller, a voice input device, a scanning device, a digital camera, remote control, or another device that provides input to the computing environment 3400. The output device(s) 3460 can be a display, television, monitor, printer, speaker, or another device that provides output from the computing environment 3400.

The communication connection(s) 3490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 3400, computer-readable media include memory 3420, storage 3440, communication media, and combinations of any of the above.

Of course, FIG. 34 illustrates computing environment 3400, display device 3460, and input device 3450 as separate devices for ease of identification only. Computing environment 3400, display device 3460, and input device 3450 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 3400 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

What is claimed is:

1. A method executed by one or more computing devices for efficient detection of anomalous user behavior on a computer network, the method comprising:

storing, by at least one of the one or more computing devices, user activity data corresponding to activity on the computer network that is collected over an observation interval, wherein the user activity data comprises a plurality of data objects corresponding to a plurality of users and wherein each data object in the plurality of data objects comprises a plurality of activity parameters;

grouping, by at least one of the one or more computing devices, the plurality of data objects into a plurality of clusters based at least in part on the plurality of activity parameters for each data object;

calculating, by at least one of the one or more computing devices, one or more outlier metrics corresponding to each cluster in the plurality of clusters, wherein each outlier metric in the one or more outlier metrics indicates a degree to which a corresponding cluster is an outlier relative to other clusters in the plurality of clusters;

calculating, by at least one of the one or more computing devices, an irregularity score for each data object in the plurality of data objects based at least in part on a size of a cluster which contains the data object and the one or more outlier metrics corresponding to the cluster which contains the data object;

generating, by at least one of the one or more computing devices, a plurality of object postures by encoding the irregularity score and the plurality of activity parameters for each data object in the plurality of data objects as an object posture, each object posture comprising a string data structure comprised of a plurality of substrings, each substring indicating a state of either the irregularity score or an activity parameter in the plurality of activity parameters for a corresponding data object over the observation interval; and identifying by at least one of the one or more computing devices, anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval.

2. The method of claim 1, wherein the plurality of activity parameters include one or more of: a number of data stores accessed by a user, a number of sensitive data stores accessed by a user, a number of records affected by a user, a number of requests by a user, a time of access by a user, a number of sensitive requests by a user, a number of sensitive records affected by a user, a user location, a user host relocation anomaly metric, a user activity timing anomaly metric, or a forwarding network path of a user.

3. The method of claim 1, further comprising, prior to grouping the plurality of data objects into a plurality of clusters:
determining, by at least one of the one or more computing devices, whether the user activity data corresponding to one or more activity parameters in the plurality of activity parameters conforms to a normal distribution; and
transforming, by at least one of the one or more computing devices, the user activity data corresponding to the one or more activity parameters to conform to a normal distribution based at least in part on a determination that user activity data corresponding to the one or more activity parameters does not conform to a normal distribution.

4. The method of claim 1, further comprising, prior to grouping the plurality of data objects into a plurality of clusters:
normalizing, by at least one of the one or more computing devices, the user activity data corresponding to one or more activity parameters in the plurality of activity parameters.

5. The method of claim 1, further comprising, prior to grouping the plurality of data objects into a plurality of clusters:
reducing, by at least one of the one or more computing devices, a number of dimensions in the user activity data by removing data corresponding to one or more activity parameters in the plurality of activity parameters.

6. The method of claim 1, wherein the one or more outlier metrics comprise one or more of a distance-based outlier metric and a density-based cluster outlier metric.

7. The method of claim 6, wherein calculating an irregularity score for each data object in the plurality of data objects based at least in part on a size of a cluster which contains the data object and the one or more outlier metrics corresponding to the cluster which contains the data object comprises:
calculating a singularity metric for the cluster which contains the data object based at least in part on the size of the cluster;
calculating the distance-based outlier metric for the cluster which contains the data object;
calculating the density-based outlier metric for the cluster which contains the data object; and
determining the irregularity score for the data object based at least in part on the singularity metric, the distance-based outlier metric, and the density-based outlier metric.

8. The method of claim 7, wherein determining the irregularity score for the data object based at least in part on the singularity metric, the distance-based outlier detection confidence metric, and the density-based outlier detection confidence metric comprises:
mapping the singularity metric to one or more singularity levels in a plurality of singularity levels based at least in part on a first fuzzy membership function mapping a range of values of the singularity metric to the plurality singularity levels;
mapping the distance-based outlier metric to one or more distance-based outlier levels in a plurality of distance-based outlier levels based at least in part on a second fuzzy membership function mapping a range of values of the distance-based outlier metric to the plurality distance-based outlier levels;
mapping the density-based outlier metric to one or more density-based outlier levels in a plurality of density-based outlier levels based at least in part on a third fuzzy membership function mapping a range of values of the density-based outlier metric to the plurality density-based outlier levels;
mapping one or more combinations of the one or more singularity levels, the one or more distance-based outlier levels, and the one or more density-based outlier levels to one or more irregularity levels in a plurality of irregularity levels based at least in part on a set of fuzzy rules mapping combinations of the plurality of singularity levels, the plurality of distance-based outlier levels, and the plurality of density-based outlier levels to the plurality of irregularity levels; and
applying an irregularity decision function to the one or more irregularity levels to generate the irregularity score.

9. The method of claim 1, wherein generating a plurality of object postures by encoding the irregularity score and the plurality of activity parameters for each data object in the plurality of data objects as an object posture comprises, for each data object in the plurality of data objects:
mapping each activity parameter in the plurality of activity parameters to a segment value in a set of segment values and assigning a corresponding variation value to each activity parameter based at least in part on a fuzzy membership function corresponding to that activity parameter, wherein the fuzzy membership function corresponding to that activity parameter is configured to map possible values of that activity parameter to the set of segment values;

mapping the irregularity score of the data object to an irregularity value in a set of irregularity values and assigning a corresponding irregularity variation value to the irregularity score based at least in part on an irregularity fuzzy membership function, wherein the irregularity fuzzy membership function is configured to map possible values of that irregularity score to the set of irregularity values; and generating the object posture of the data object based at least in part on a plurality of segment values mapped to the plurality of activity parameters and the irregularity value mapped to the irregularity score.

10. The method of claim 9, wherein mapping each activity parameter in the plurality of activity parameters to a segment value in a set of segment values and assigning a corresponding variation value to each activity parameter based at least in part on a fuzzy membership function corresponding to that activity parameter comprises:

determining one or more segment values in the set of segment values which correspond to the activity parameter based at least in part on the fuzzy membership function;

mapping a lowest segment value in the one or more segment values to the activity parameter;

determining a variation value based at least in part on a quantity of the one or more segment values which correspond to the activity parameter; and assigning the variation value to the activity parameter.

11. The method of claim 9, wherein mapping the irregularity score of the data object to an irregularity value in a set of irregularity values and assigning a corresponding irregularity variation value to the irregularity score based at least in part on an irregularity fuzzy membership function comprises:

determining one or more irregularity values in the set of irregularity values which correspond to the irregularity score based at least in part on the irregularity fuzzy membership function;

mapping a lowest irregularity value in the one or more irregularity values to the irregularity score;

determining an irregularity variation value based at least in part on a quantity of the one or more irregularity values which correspond to the irregularity score; and assigning the irregularity variation value to the irregularity score.

12. The method of claim 9, further comprising, prior to generating the object posture of the data object:

mapping, by at least one of the one or more computing devices, one or more activity parameters in the plurality of activity parameters to one or more additional segment values in the set of segment values based at least in part on one or more variation values corresponding to the one or more activity parameters and one or more fuzzy membership functions corresponding to the one or more activity parameters; and mapping, by at least one of the one or more computing devices, the irregularity score of the data object to one or more additional irregularity values in the set of irregularity values based at least in part on the irregularity variation value corresponding to the irregularity score and the irregularity fuzzy membership function.

13. The method of claim 12, wherein mapping one or more activity parameters in the plurality of activity parameters to one or more additional segment values in the set of segment values based at least in part on one or more variation values corresponding to the one or more activity parameters and one or more fuzzy membership functions corresponding to the one or more activity parameters comprises:

identifying one or more activity parameters in the plurality of activity parameters which have a corresponding variation value which is greater than zero;

determining, for each activity parameter in the identified one or more activity parameters, one or more possible segment values corresponding to that activity parameter, wherein the one or more possible segment values are based at least in part on the variation value assigned to that activity parameter, the segment value mapped to that activity parameter, and the fuzzy membership function corresponding to that activity parameter;

concatenating, for each activity parameter in the identified one or more activity parameters, the one or more possible segment values corresponding to that activity parameter to generate a concatenated list of possible segment values; and mapping, for each activity parameter in the identified one or more activity parameters, the concatenated list of possible segment values to the corresponding activity parameter.

14. The method of claim 12, wherein mapping the irregularity score of the data object to one or more additional irregularity values in the set of irregularity values based at least in part on the irregularity variation value corresponding to the irregularity score and the irregularity fuzzy membership function comprises:

determining one or more possible irregularity values corresponding to the irregularity score, wherein the one or more possible irregularity values are based at least in part on the irregularity variation value assigned to the irregularity score, the irregularity value mapped to the irregularity score, and the irregularity fuzzy membership function; and concatenating the one or more possible irregularity values corresponding to the irregularity score to generate a concatenated list of possible irregularity values; and mapping the concatenated list of possible irregularity values to the irregularity score.

15. The method of claim 9, wherein generating the object posture of the data object based at least in part on a plurality of segment values corresponding to the plurality of activity parameters and the irregularity value corresponding to the irregularity score comprises:

concatenating all segment values mapped to the plurality of activity parameters and all irregularity values mapped to the irregularity score.

16. The method of claim 1, wherein identifying anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval comprises:

calculating the string metric between the at least one object posture and the at least one previous object posture corresponding to the same user; and identifying activity of the at least one user as anomalous based at least in part on a determination that the string metric is greater than a threshold string metric.

17. The method of claim 16, wherein the string metric comprises a Levenshtein distance metric between the at least one object posture and the at least previous object posture corresponding to the same user.

18. An apparatus for efficient detection of anomalous user behavior on a computer network, the apparatus comprising:
one or more processors; and
one or more memories operatively coupled to at least one of the one or more processors and having instructions stored thereon that, when executed by at least one of the one or more processors, cause at least one of the one or more processors to:
store user activity data corresponding to activity on the computer network that is collected over an observation interval, wherein the user activity data comprises a plurality of data objects corresponding to a plurality of users and wherein each data object in the plurality of data objects comprises a plurality of activity parameters;
group the plurality of data objects into a plurality of clusters based at least in part on the plurality of activity parameters for each data object;
calculate one or more outlier metrics corresponding to each cluster in the plurality of clusters, wherein each outlier metric in the one or more outlier metrics indicates measures a degree to which a corresponding cluster lies outside of is an outlier relative to other clusters in the plurality of clusters;
calculate an irregularity score for each of one or more data objects in the plurality of data objects based at least in part on a size of a cluster which contains the data object and the one or more outlier metrics corresponding to the cluster which contains the data object;
generate a plurality of object postures by encoding the irregularity score and the plurality of activity parameters for each data object in the plurality of data objects as an object posture, each object posture comprising a string data structure comprised of a plurality of sub strings, each sub string indicating a state of either the irregularity score or an activity parameter in the plurality of activity parameters for a corresponding data object over the observation interval; and
identify anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval.

19. The apparatus of claim 18, wherein the plurality of activity parameters include one or more of: a number of data stores accessed by a user, a number of sensitive data stores accessed by a user, a number of records affected by a user, a number of requests by a user, a time of access by a user, a number of sensitive requests by a user, a number of sensitive records affected by a user, a user location, a user host relocation anomaly metric, a user activity timing anomaly metric, or a forwarding network path of a user.

20. The apparatus of claim 18, wherein at least one of the one or more memories has further instructions stored thereon that, when executed by at least one of the one or more processors, cause at least one of the one or more processors to, prior to grouping the plurality of data objects into a plurality of clusters:
determine whether the user activity data corresponding to one or more activity parameters in the plurality of activity parameters conforms to a normal distribution; and
transform the user activity data corresponding to the one or more activity parameters to conform to a normal distribution based at least in part on a determination that user activity data corresponding to the one or more activity parameters does not conform to a normal distribution.

21. The apparatus of claim 18, wherein at least one of the one or more memories has further instructions stored thereon that, when executed by at least one of the one or more processors, cause at least one of the one or more processors to, prior to grouping the plurality of data objects into a plurality of clusters:
normalize the user activity data corresponding to one or more activity parameters in the plurality of activity parameters.

22. The apparatus of claim 18, wherein at least one of the one or more memories has further instructions stored thereon that, when executed by at least one of the one or more processors, cause at least one of the one or more processors to, prior to grouping the plurality of data objects into a plurality of clusters:
reduce a number of dimensions in the user activity data by removing data corresponding to one or more activity parameters in the plurality of activity parameters.

23. The apparatus of claim 18, wherein the one or more outlier metrics comprise one or more of a distance-based outlier metric and a density-based cluster outlier metric.

24. The apparatus of claim 23, wherein the instructions that, when executed by at least one of the one or more processors, cause at least one of the one or more processors to calculate an irregularity score for each data object in the plurality of data objects based at least in part on a size of a cluster which contains the data object and the one or more outlier metrics corresponding to the cluster which contains the data object further cause at least one of the one or more processors to:
calculate a singularity metric for the cluster which contains the data object based at least in part on the size of the cluster;
calculate the distance-based outlier metric for the cluster which contains the data object;
calculate the density-based outlier metric for the cluster which contains the data object; and
determine the irregularity score for the data object based at least in part on the singularity metric, the distance-based outlier metric, and the density-based outlier metric.

25. The apparatus of claim 24, wherein the instructions that, when executed by at least one of the one or more processors, cause at least one of the one or more processors to determine the irregularity score for the data object based at least in part on the singularity metric, the distance-based outlier detection confidence metric, and the density-based outlier detection confidence metric further cause at least one of the one or more processors to:
map the singularity metric to one or more singularity levels in a plurality of singularity levels based at least in part on a first fuzzy membership function mapping a range of values of the singularity metric to the plurality singularity levels;

map the distance-based outlier metric to one or more distance-based outlier levels in a plurality of distance-based outlier levels based at least in part on a second fuzzy membership function mapping a range of values of the distance-based outlier metric to the plurality distance-based outlier levels;

map the density-based outlier metric to one or more density-based outlier levels in a plurality of density-based outlier levels based at least in part on a third fuzzy membership function mapping a range of values of the density-based outlier metric to the plurality density-based outlier levels;

map one or more combinations of the one or more singularity levels, the one or more distance-based outlier levels, and the one or more density-based outlier levels to one or more irregularity levels in a plurality of irregularity levels based at least in part on a set of fuzzy rules mapping combinations of the plurality of singularity levels, the plurality of distance-based outlier levels, and the plurality of density-based outlier levels to the plurality of irregularity levels; and apply an irregularity decision function to the one or more irregularity levels to generate the irregularity score.

26. The apparatus of claim 18, wherein the instructions that, when executed by at least one of the one or more processors, cause at least one of the one or more processors to generate a plurality of object postures by encoding the irregularity score and the plurality of activity parameters for each data object in the plurality of data objects as an object posture further cause at least one of the one or more processors to, for each data object in the plurality of data objects:

map each activity parameter in the plurality of activity parameters to a segment value in a set of segment values and assigning a corresponding variation value to each activity parameter based at least in part on a fuzzy membership function corresponding to that activity parameter, wherein the fuzzy membership function corresponding to that activity parameter is configured to map possible values of that activity parameter to the set of segment values;

map the irregularity score of the data object to an irregularity value in a set of irregularity values and assigning a corresponding irregularity variation value to the irregularity score based at least in part on an irregularity fuzzy membership function, wherein the irregularity fuzzy membership function is configured to map possible values of that irregularity score to the set of irregularity values; and generate the object posture of the data object based at least in part on a plurality of segment values mapped to the plurality of activity parameters and the irregularity value mapped to the irregularity score.

27. The apparatus of claim 26, wherein the instructions that, when executed by at least one of the one or more processors, cause at least one of the one or more processors to map each activity parameter in the plurality of activity parameters to a segment value in a set of segment values and assign a corresponding variation value to each activity parameter based at least in part on a fuzzy membership function corresponding to that activity parameter further cause at least one of the one or more processors to:

determine one or more segment values in the set of segment values which correspond to the activity parameter based at least in part on the fuzzy membership function;

map a lowest segment value in the one or more segment values to the activity parameter;

determine a variation value based at least in part on a quantity of the one or more segment values which correspond to the activity parameter; and assign the variation value to the activity parameter.

28. The apparatus of claim 26, wherein the instructions that, when executed by at least one of the one or more processors, cause at least one of the one or more processors to map the irregularity score of the data object to an irregularity value in a set of irregularity values and assign a corresponding irregularity variation value to the irregularity score based at least in part on an irregularity fuzzy membership function further cause at least one of the one or more processors to:

determine one or more irregularity values in the set of irregularity values which correspond to the irregularity score based at least in part on the irregularity fuzzy membership function;

map a lowest irregularity value in the one or more irregularity values to the irregularity score;

determine an irregularity variation value based at least in part on a quantity of the one or more irregularity values which correspond to the irregularity score; and assign the irregularity variation value to the irregularity score.

29. The apparatus of claim 26, wherein at least one of the one or more memories has further instructions stored thereon that, when executed by at least one of the one or more processors, cause at least one of the one or more processors to, prior to generating the object posture of the data object:

map one or more activity parameters in the plurality of activity parameters to one or more additional segment values in the set of segment values based at least in part on one or more variation values corresponding to the one or more activity parameters and one or more fuzzy membership functions corresponding to the one or more activity parameters; and map the irregularity score of the data object to one or more additional irregularity values in the set of irregularity values based at least in part on the irregularity variation value corresponding to the irregularity score and the irregularity fuzzy membership function.

30. The apparatus of claim 29, wherein the instructions that, when executed by at least one of the one or more processors, cause at least one of the one or more processors to map one or more activity parameters in the plurality of activity parameters to one or more additional segment values in the set of segment values based at least in part on one or more variation values corresponding to the one or more activity parameters and one or more fuzzy membership functions corresponding to the one or more activity parameters further cause at least one of the one or more processors to:

identify one or more activity parameters in the plurality of activity parameters which have a corresponding variation value which is greater than zero;

determine, for each activity parameter in the identified one or more activity parameters, one or more possible segment values corresponding to that activity parameter, wherein the one or more possible segment values are based at least in part on the variation value assigned to that activity parameter, the segment value mapped to that activity parameter, and the fuzzy membership function corresponding to that activity parameter;

concatenate, for each activity parameter in the identified one or more activity parameters, the one or more possible segment values corresponding to that activity parameter to generate a concatenated list of possible segment values; and map, for each activity parameter in the identified one or more activity parameters, the concatenated list of possible segment values to the corresponding activity parameter.

31. The apparatus of claim 29, wherein the instructions that, when executed by at least one of the one or more processors, cause at least one of the one or more processors to map the irregularity score of the data object to one or more additional irregularity values in the set of irregularity values based at least in part on the irregularity variation value corresponding to the irregularity score and the irregularity fuzzy membership function further cause at least one of the one or more processors to:

determine one or more possible irregularity values corresponding to the irregularity score, wherein the one or more possible irregularity values are based at least in part on the irregularity variation value assigned to the irregularity score, the irregularity value mapped to the irregularity score, and the irregularity fuzzy membership function; and concatenate the one or more possible irregularity values corresponding to the irregularity score to generate a concatenated list of possible irregularity values; and map the concatenated list of possible irregularity values to the irregularity score.

32. The apparatus of claim 26, wherein the instructions that, when executed by at least one of the one or more processors, cause at least one of the one or more processors to generate the object posture of the data object based at least in part on a plurality of segment values corresponding to the plurality of activity parameters and the irregularity value corresponding to the irregularity score further cause at least one of the one or more processors to:

concatenate all segment values mapped to the plurality of activity parameters and all irregularity values mapped to the irregularity score.

33. The apparatus of claim 18, wherein the instructions that, when executed by at least one of the one or more processors, cause at least one of the one or more processors to identify anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval further cause at least one of the one or more processors to:

calculate the string metric between the at least one object posture and the at least one previous object posture corresponding to the same user; and identify activity of the at least one user as anomalous based at least in part on a determination that the string metric is greater than a threshold string metric.

34. The apparatus of claim 33, wherein the string metric comprises a Levenshtein distance metric between the at least one object posture and the at least previous object posture corresponding to the same user.

35. At least one non-transitory computer-readable medium storing computer-readable instructions that, when executed by one or more computing devices, cause at least one of the one or more computing devices to:

store user activity data corresponding to activity on the computer network that is collected over an observation interval, wherein the user activity data comprises a plurality of data objects corresponding to a plurality of users and wherein each data object in the plurality of data objects comprises a plurality of activity parameters;

group the plurality of data objects into a plurality of clusters based at least in part on the plurality of activity parameters for each data object;

calculate one or more outlier metrics corresponding to each cluster in the plurality of clusters, wherein each outlier metric in the one or more outlier metrics indicates measures a degree to which a corresponding cluster lies outside of is an outlier relative to other clusters in the plurality of clusters;

calculate an irregularity score for each of one or more data objects in the plurality of data objects based at least in part on a size of a cluster which contains the data object and the one or more outlier metrics corresponding to the cluster which contains the data object;

generate a plurality of object postures by encoding the irregularity score and the plurality of activity parameters for each data object in the plurality of data objects as an object posture, each object posture comprising a string data structure comprised of a plurality of sub strings, each sub string indicating a state of either the irregularity score or an activity parameter in the plurality of activity parameters for a corresponding data object over the observation interval; and identify anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval.

36. The at least one non-transitory computer-readable medium of claim 35, wherein the plurality of activity parameters include one or more of: a number of data stores accessed by a user, a number of sensitive data stores accessed by a user, a number of records affected by a user, a number of requests by a user, a time of access by a user, a number of sensitive requests by a user, a number of sensitive records affected by a user, a user location, a user host relocation anomaly metric, a user activity timing anomaly metric, or a forwarding network path of a user.

37. The at least one non-transitory computer-readable medium of claim 35, further storing computer-readable instructions that, when executed by at least one of the one or more computing devices, cause at least one of the one or more computing devices to, prior to grouping the plurality of data objects into a plurality of clusters:

determine whether the user activity data corresponding to one or more activity parameters in the plurality of activity parameters conforms to a normal distribution; and transform the user activity data corresponding to the one or more activity parameters to conform to a normal distribution based at least in part on a determination that user activity data corresponding to the one or more activity parameters does not conform to a normal distribution.

38. The at least one non-transitory computer-readable medium of claim 35, further storing computer-readable instructions that, when executed by at least one of the one or more computing devices, cause at least one of the one or more computing devices to, prior to grouping the plurality of data objects into a plurality of clusters:

normalize the user activity data corresponding to one or more activity parameters in the plurality of activity parameters.

39. The at least one non-transitory computer-readable medium of claim 35, further storing computer-readable instructions that, when executed by at least one of the one or more computing devices, cause at least one of the one or more computing devices to, prior to grouping the plurality of data objects into a plurality of clusters:

reduce a number of dimensions in the user activity data by removing data corresponding to one or more activity parameters in the plurality of activity parameters.

40. The at least one non-transitory computer-readable medium of claim 35, wherein the one or more outlier metrics comprise one or more of a distance-based outlier metric and a density-based cluster outlier metric.

41. The at least one non-transitory computer-readable medium of claim 40, wherein the instructions that, when executed by at least one of the one or more computing devices, cause at least one of the one or more computing devices to calculate an irregularity score for each data object in the plurality of data objects based at least in part on a size of a cluster which contains the data object and the one or more outlier metrics corresponding to the cluster which contains the data object further cause at least one of the one or more computing devices to:

calculate a singularity metric for the cluster which contains the data object based at least in part on the size of the cluster;

calculate the distance-based outlier metric for the cluster which contains the data object;

calculate the density-based outlier metric for the cluster which contains the data object; and determine the irregularity score for the data object based at least in part on the singularity metric, the distance-based outlier metric, and the density-based outlier metric.

42. The at least one non-transitory computer-readable medium of claim 41, wherein the instructions that, when executed by at least one of the one or more computing devices, cause at least one of the one or more computing devices to determine the irregularity score for the data object based at least in part on the singularity metric, the distance-based outlier detection confidence metric, and the density-based outlier detection confidence metric further cause at least one of the one or more computing devices to:

map the singularity metric to one or more singularity levels in a plurality of singularity levels based at least in part on a first fuzzy membership function mapping a range of values of the singularity metric to the plurality singularity levels;

map the distance-based outlier metric to one or more distance-based outlier levels in a plurality of distance-based outlier levels based at least in part on a second fuzzy membership function mapping a range of values of the distance-based outlier metric to the plurality distance-based outlier levels;

map the density-based outlier metric to one or more density-based outlier levels in a plurality of density-based outlier levels based at least in part on a third fuzzy membership function mapping a range of values of the density-based outlier metric to the plurality density-based outlier levels;

map one or more combinations of the one or more singularity levels, the one or more distance-based outlier levels, and the one or more density-based outlier levels to one or more irregularity levels in a plurality of irregularity levels based at least in part on a set of fuzzy rules mapping combinations of the plurality of singularity levels, the plurality of distance-based outlier levels, and the plurality of density-based outlier levels to the plurality of irregularity levels; and apply an irregularity decision function to the one or more irregularity levels to generate the irregularity score.

43. The at least one non-transitory computer-readable medium of claim 35, wherein the instructions that, when executed by at least one of the one or more computing devices, cause at least one of the one or more computing devices to generate a plurality of object postures by encoding the irregularity score and the plurality of activity parameters for each data object in the plurality of data objects as an object posture further cause at least one of the one or more computing devices to, for each data object in the plurality of data objects:

map each activity parameter in the plurality of activity parameters to a segment value in a set of segment values and assigning a corresponding variation value to each activity parameter based at least in part on a fuzzy membership function corresponding to that activity parameter, wherein the fuzzy membership function corresponding to that activity parameter is configured to map possible values of that activity parameter to the set of segment values;

map the irregularity score of the data object to an irregularity value in a set of irregularity values and assigning a corresponding irregularity variation value to the irregularity score based at least in part on an irregularity fuzzy membership function, wherein the irregularity fuzzy membership function is configured to map possible values of that irregularity score to the set of irregularity values; and generate the object posture of the data object based at least in part on a plurality of segment values mapped to the plurality of activity parameters and the irregularity value mapped to the irregularity score.

44. The at least one non-transitory computer-readable medium of claim 43, wherein the instructions that, when executed by at least one of the one or more computing devices, cause at least one of the one or more computing devices to map each activity parameter in the plurality of activity parameters to a segment value in a set of segment values and assign a corresponding variation value to each activity parameter based at least in part on a fuzzy membership function corresponding to that activity parameter further cause at least one of the one or more computing devices to:

determine one or more segment values in the set of segment values which correspond to the activity parameter based at least in part on the fuzzy membership function;

map a lowest segment value in the one or more segment values to the activity parameter;

determine a variation value based at least in part on a quantity of the one or more segment values which correspond to the activity parameter; and assign the variation value to the activity parameter.

45. The at least one non-transitory computer-readable medium of claim 43, wherein the instructions that, when executed by at least one of the one or more computing devices, cause at least one of the one or more computing devices to map the irregularity score of the data object to an irregularity value in a set of irregularity values and assign a corresponding irregularity variation value to the irregularity score based at least in part on an irregularity fuzzy membership function further cause at least one of the one or more computing devices to:
- determine one or more irregularity values in the set of irregularity values which correspond to the irregularity score based at least in part on the irregularity fuzzy membership function;
- map a lowest irregularity value in the one or more irregularity values to the irregularity score;
- determine an irregularity variation value based at least in part on a quantity of the one or more irregularity values which correspond to the irregularity score; and
- assign the irregularity variation value to the irregularity score.

46. The at least one non-transitory computer-readable medium of claim 43, further storing computer-readable instructions that, when executed by at least one of the one or more computing devices, cause at least one of the one or more computing devices to, prior to generating the object posture of the data object:
- map one or more activity parameters in the plurality of activity parameters to one or more additional segment values in the set of segment values based at least in part on one or more variation values corresponding to the one or more activity parameters and one or more fuzzy membership functions corresponding to the one or more activity parameters; and
- map the irregularity score of the data object to one or more additional irregularity values in the set of irregularity values based at least in part on the irregularity variation value corresponding to the irregularity score and the irregularity fuzzy membership function.

47. The at least one non-transitory computer-readable medium of claim 46, wherein the instructions that, when executed by at least one of the one or more computing devices, cause at least one of the one or more computing devices to map one or more activity parameters in the plurality of activity parameters to one or more additional segment values in the set of segment values based at least in part on one or more variation values corresponding to the one or more activity parameters and one or more fuzzy membership functions corresponding to the one or more activity parameters further cause at least one of the one or more computing devices to:
- identify one or more activity parameters in the plurality of activity parameters which have a corresponding variation value which is greater than zero;
- determine, for each activity parameter in the identified one or more activity parameters, one or more possible segment values corresponding to that activity parameter, wherein the one or more possible segment values are based at least in part on the variation value assigned to that activity parameter, the segment value mapped to that activity parameter, and the fuzzy membership function corresponding to that activity parameter;
- concatenate, for each activity parameter in the identified one or more activity parameters, the one or more possible segment values corresponding to that activity parameter to generate a concatenated list of possible segment values; and
- map, for each activity parameter in the identified one or more activity parameters, the concatenated list of possible segment values to the corresponding activity parameter.

48. The at least one non-transitory computer-readable medium of claim 46, wherein the instructions that, when executed by at least one of the one or more computing devices, cause at least one of the one or more computing devices to map the irregularity score of the data object to one or more additional irregularity values in the set of irregularity values based at least in part on the irregularity variation value corresponding to the irregularity score and the irregularity fuzzy membership function further cause at least one of the one or more computing devices to:
- determine one or more possible irregularity values corresponding to the irregularity score, wherein the one or more possible irregularity values are based at least in part on the irregularity variation value assigned to the irregularity score, the irregularity value mapped to the irregularity score, and the irregularity fuzzy membership function; and
- concatenate the one or more possible irregularity values corresponding to the irregularity score to generate a concatenated list of possible irregularity values; and
- map the concatenated list of possible irregularity values to the irregularity score.

49. The at least one non-transitory computer-readable medium of claim 43, wherein the instructions that, when executed by at least one of the one or more computing devices, cause at least one of the one or more computing devices to generate the object posture of the data object based at least in part on a plurality of segment values corresponding to the plurality of activity parameters and the irregularity value corresponding to the irregularity score further cause at least one of the one or more computing devices to:
- concatenate all segment values mapped to the plurality of activity parameters and all irregularity values mapped to the irregularity score.

50. The at least one non-transitory computer-readable medium of claim 35, wherein the instructions that, when executed by at least one of the one or more computing devices, cause at least one of the one or more computing devices to identify anomalous activity of at least one user in the plurality of users based at least in part on a string metric measuring a distance between at least one object posture in the plurality of object postures and at least one previous object posture corresponding to a same user as the at least one object posture during a different observation interval prior to the observation interval further cause at least one of the one or more computing devices to:
- calculate the string metric between the at least one object posture and the at least one previous object posture corresponding to the same user; and
- identify activity of the at least one user as anomalous based at least in part on a determination that the string metric is greater than a threshold string metric.

51. The at least one non-transitory computer-readable medium of claim 50, wherein the string metric comprises a Levenshtein distance metric between the at least one object posture and the at least previous object posture corresponding to the same user.

* * * * *